(12) United States Patent
Ikeda et al.

(10) Patent No.: US 12,044,934 B2
(45) Date of Patent: Jul. 23, 2024

(54) OPTICAL ELEMENT

(71) Applicant: Japan Display Inc., Tokyo (JP)

(72) Inventors: Kojiro Ikeda, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/506,522

(22) Filed: Nov. 10, 2023

(65) Prior Publication Data

US 2024/0077768 A1 Mar. 7, 2024

Related U.S. Application Data

(63) Continuation of application No. PCT/JP2022/019371, filed on Apr. 28, 2022.

(30) Foreign Application Priority Data

May 12, 2021 (JP) .................. 2021-081218

(51) Int. Cl.
*G02F 1/1343* (2006.01)
*G02F 1/1347* (2006.01)

(52) U.S. Cl.
CPC ...... *G02F 1/134309* (2013.01); *G02F 1/1347* (2013.01)

(58) Field of Classification Search
CPC .................................................. G02F 1/1347
See application file for complete search history.

(56) References Cited

U.S. PATENT DOCUMENTS

| 2005/0243237 A1 | 11/2005 | Sasuga |
| 2019/0025657 A1* | 1/2019 | Presniakov ....... G02F 1/134363 |
| 2020/0041852 A1 | 2/2020 | Hikmet et al. |

FOREIGN PATENT DOCUMENTS

| JP | 2005317879 A | 11/2005 |
| JP | 2010230887 A | 10/2010 |
| JP | 2014160277 A | 9/2014 |

\* cited by examiner

*Primary Examiner* — Alexander P Gross
(74) *Attorney, Agent, or Firm* — K&L Gates LLP

(57) ABSTRACT

An optical element includes first to fourth liquid crystal cells. Each of the first to fourth liquid crystal cells includes a first substrate on which a first pair of comb-shaped transparent electrodes are arranged and a second substrate on which a second pair of comb-shaped transparent electrodes are arranged. An extending direction of the first pair of comb-shaped transparent electrodes is orthogonal to an extending direction of the second pair of comb-shaped transparent electrodes. Between two different liquid crystal cells of the first to fourth liquid crystal cells, one of the first pair of comb-shaped transparent electrodes of one liquid crystal cell and one of the second pair of comb-shaped transparent electrodes of the other liquid crystal cell are electrically connected to each other.

18 Claims, 22 Drawing Sheets

OPTICAL ELEMENT

CROSS-REFERENCE TO RELATED APPLICATIONS

This application is a Continuation of International Patent Application No. PCT/JP2022/019371, filed on Apr. 28, 2022, which claims the benefit of priority to Japanese Patent Application No. 2021-081218, filed on May 12, 2021, the entire contents of which are incorporated herein by reference.

FIELD

An embodiment of the present invention relates to an optical element that controls the distribution of light emitted from a light source.

BACKGROUND

An optical element which is a so-called liquid crystal lens has been conventionally known in which a change in the refractive index of a liquid crystal is utilized by adjusting a voltage applied to the liquid crystal (for example, see Japanese laid-open patent publication No. 2005-317879, 2010-230887, or 2014-160277). For example, the lighting devices disclosed in the Japanese laid-open patent publication Nos. 2005-317879 and 2010-230887 use a liquid crystal lens to distribute light from a light source in a circular shape. Further, the beam shaping device disclosed in the Japanese laid-open patent publication No. 2014-160277 changes the distribution shape of light by changing patterns of an electrode applied to a liquid crystal.

SUMMARY

An optical element according to an embodiment of the present invention includes a first liquid crystal cell, a second liquid crystal cell over the first liquid crystal cell, a third liquid crystal cell over the second liquid crystal cell, and a fourth liquid crystal cell over the third liquid crystal cell. The first liquid crystal cell includes a first substrate on which a first transparent electrode and a second transparent electrode are alternately arranged in a comb shape in a first direction, and a second substrate on which a third transparent electrode and a fourth transparent electrode are alternately arranged in a comb shape in a second direction intersecting the first direction. The second liquid crystal cell includes a third substrate adjacent to the second substrate and on which a fifth transparent electrode and a sixth transparent electrode are alternately arranged in a comb shape in the first direction, and a fourth substrate on which a seventh transparent electrode and an eighth transparent electrode are alternately arranged in a comb shape in the second direction. The third liquid crystal cell includes a fifth substrate adjacent to the fourth substrate and on which a ninth transparent electrode and a tenth transparent electrode are alternately arranged in a comb shape in the second direction, and a sixth substrate on which an eleventh transparent electrode and a twelfth transparent electrode are alternately arranged in a comb shape in the first direction. The fourth liquid crystal cell includes a seventh substrate adjacent to the sixth substrate and on which a thirteenth transparent electrode and a fourteenth transparent electrode are alternately arranged in a comb shape in the second direction, and an eighth substrate on which a fifteenth transparent electrode and a sixteenth transparent electrode are alternately arranged in a comb shape in the first direction. The first transparent electrode and the fifteenth transparent electrode are electrically connected to each other. The second transparent electrode and the sixteenth transparent electrode are electrically connected to each other. The third transparent electrode and the thirteenth transparent electrode are electrically connected to each other. The fourth transparent electrode and the fourteenth transparent electrode are electrically connected to each other. The fifth transparent electrode and the eleventh transparent electrode are electrically connected to each other. The six transparent electrode and the twelfth transparent electrode are electrically connected to each other. The seventh transparent electrode and the ninth transparent electrode are electrically connected to each other. The eighth transparent electrode and the tenth transparent electrode are electrically connected to each other.

DESCRIPTION OF EMBODIMENTS

Figure 1:
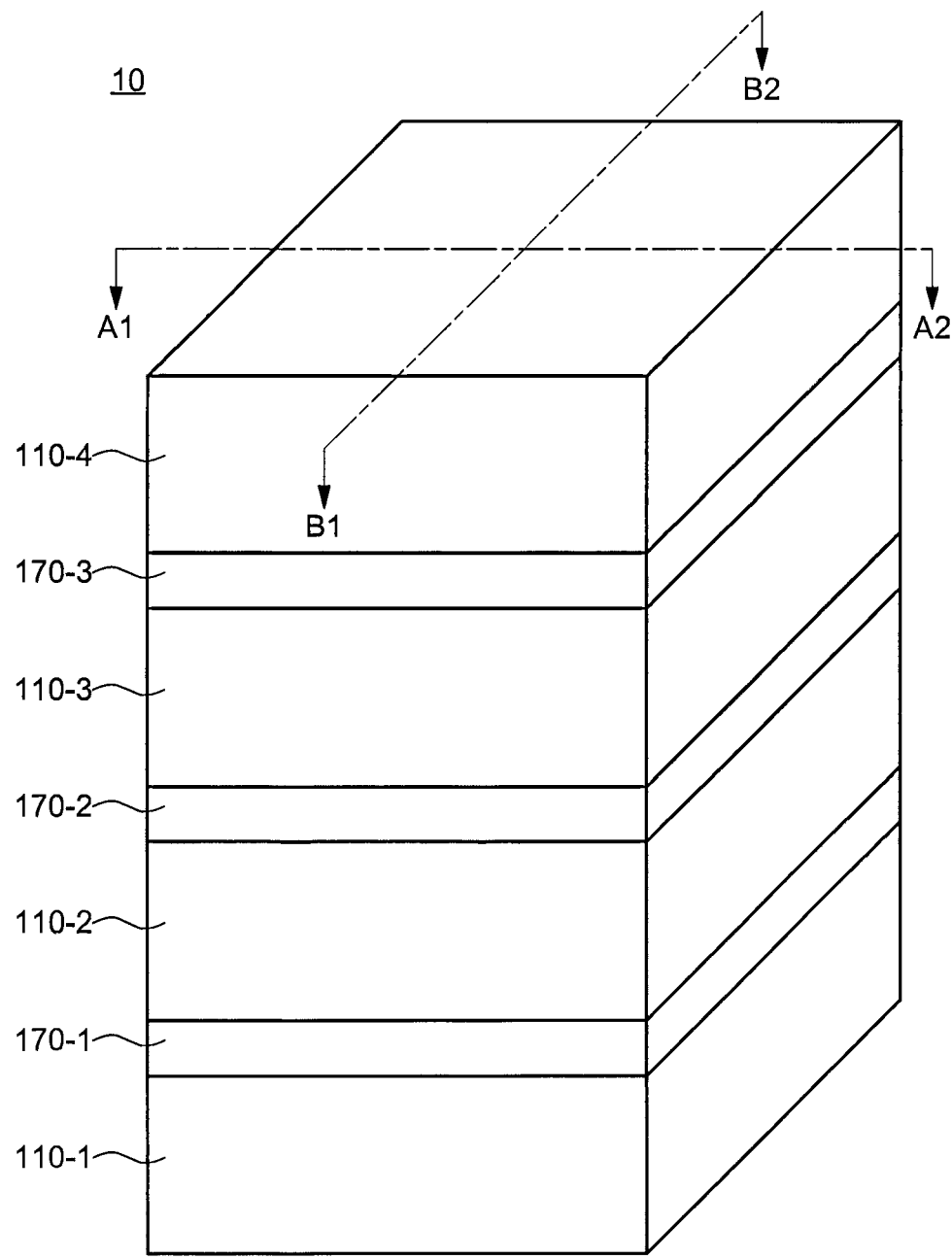
FIG. 1 is a schematic perspective view of an optical element according to an embodiment of the present invention.

In the shape of the light distribution, it is desirable to be able to control not only an isotropic shape but also an anisotropic shape. In particular, it has been desired to control the light distribution having an elliptical shape.

According to an embodiment of the present invention, an optical element can control a light distribution having an anisotropic shape.

Hereinafter, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via another structure over a certain structure, are both included.

First Embodiment

An optical element 10 according to an embodiment of the present invention is described with reference to FIGS. 1 to 8B.

[1. Configuration of Optical Element]

FIG. 1 is a schematic perspective view of the optical element 10 according to an embodiment of the present invention. As shown in FIG. 1, the optical element 10 includes a first liquid crystal cell 110-1, a second liquid crystal cell 110-2, a third liquid crystal cell 110-3, and a fourth liquid crystal cell 110-4. The first liquid crystal cell 110-1, the second liquid crystal cell 110-2, the third liquid crystal cell 110-3, and the fourth liquid crystal cell 110-4 are stacked in a z-axis direction. The second liquid crystal cell 110-2 is provided on the first liquid crystal cell 110-1. The third liquid crystal cell 110-3 is provided on the second liquid crystal cell 110-2. The fourth liquid crystal cell 110-4 is provided on the third liquid crystal cell 110-3. Although not shown in the figures, a light source is placed below the first liquid crystal cell 110-1. Therefore, light emitted from the light source passes through the first liquid crystal cell 110-1, the second liquid crystal cell 110-2, the third liquid crystal cell 110-3, and the fourth liquid crystal cell 110-4 in this order.

The first optical elastic resin layer 170-1 adheres and fixes the first liquid crystal cell 110-1 and the second liquid crystal cell 110-2. The second optical elastic resin layer 170-2 adheres and fixes the second liquid crystal cell 110-2 and the third liquid crystal cell 110-3. The third optical elastic resin layer 170-3 adheres and fixes the third liquid crystal cell 110-3 and the fourth liquid crystal cell 110-4. An adhesive including a transparent acrylic resin or epoxy resin can be used as each of the first optical elastic resin layer 170-1, the second optical elastic resin layer 170-2, and the third optical elastic resin layer 170-3.

Figure 2A:
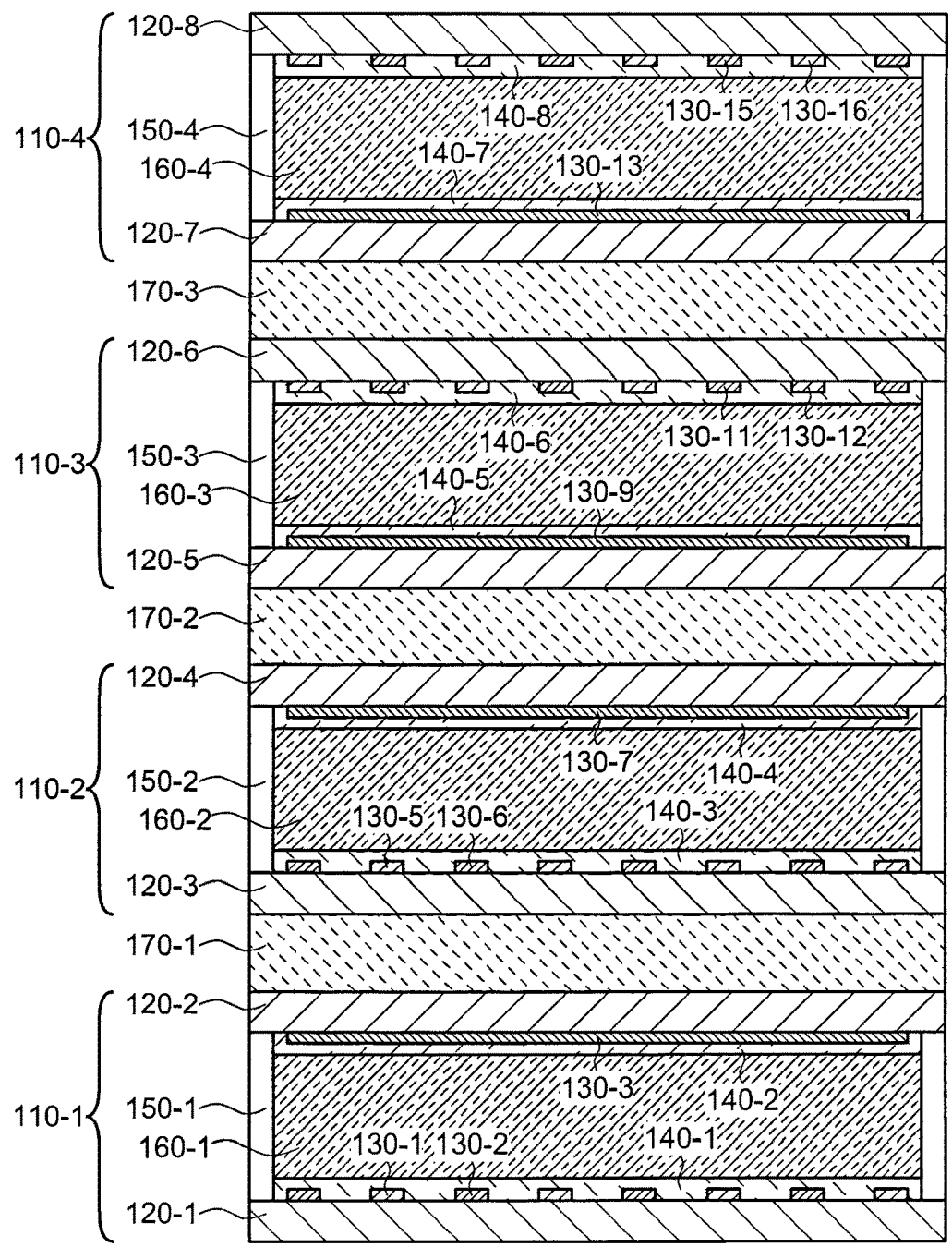
FIG. 2A is a schematic cross-sectional view of an optical element according to an embodiment of the present invention.
Figure 2B:
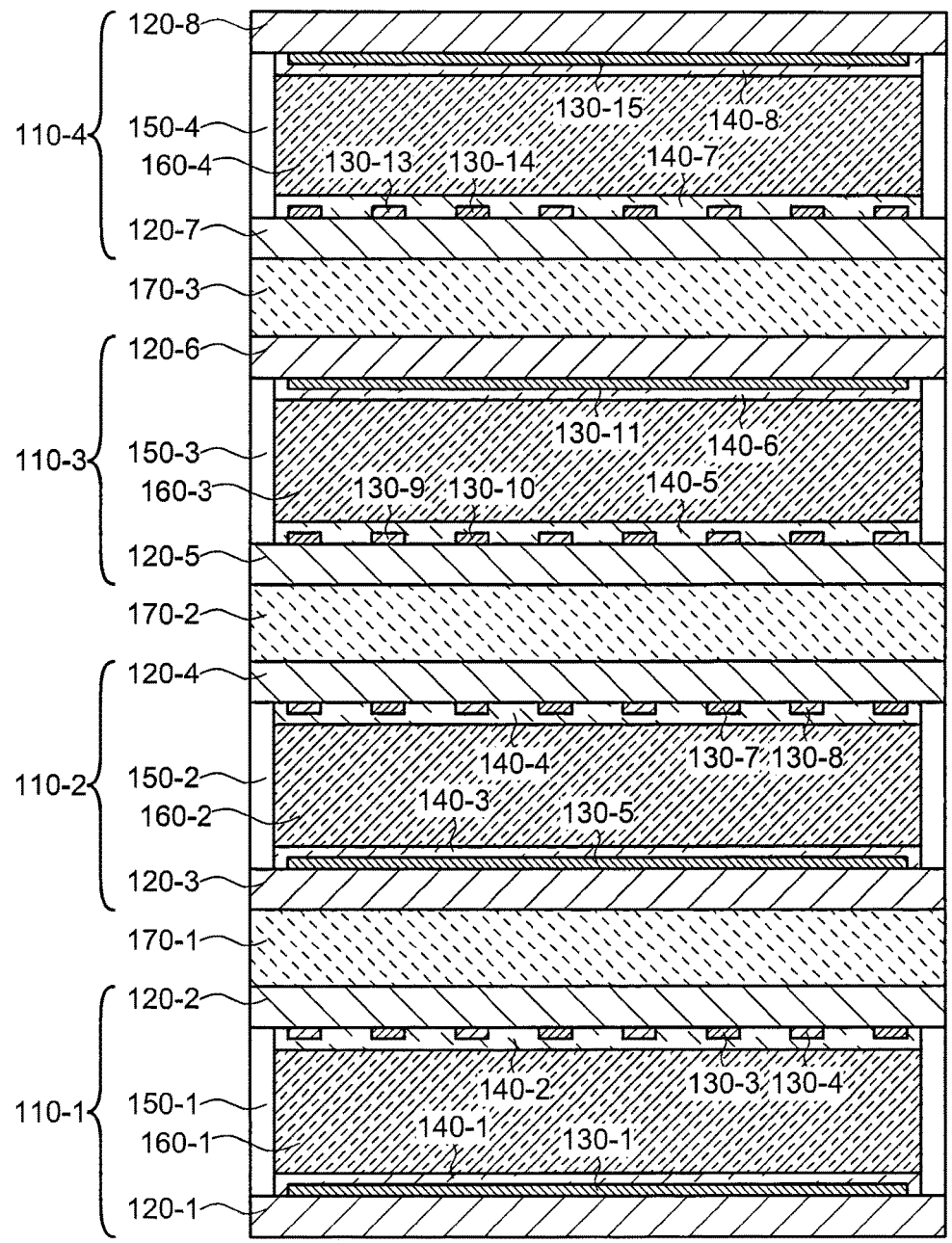
FIG. 2B is a schematic cross-sectional view of an optical element according to an embodiment of the present invention.

FIGS. 2A and 2B are schematic cross-sectional views of the optical element 10 according to an embodiment of the present invention. Specifically, FIG. 2A is a schematic cross-sectional view in a zx plane cut along a line A1-A2 shown in FIG. 1, and FIG. 2B is a schematic cross-sectional view in a yz plane cut along a line B1-B2 shown in FIG. 1. In addition, hereinafter, an x-axis direction and a y-axis direction may be described as a first direction and a second direction, respectively.

The first liquid crystal cell 110-1 includes a first substrate 120-1 on which a first transparent electrode 130-1 and a second transparent electrode 130-2 are formed and a second substrate 120-2 on which a third transparent electrode 130-3 and a fourth transparent electrode 130-4 are formed. A first alignment film 140-1 is formed over the first substrate 120-1 in order to cover the first transparent electrode 130-1 and the second transparent electrode 130-2. Further, a second alignment film 140-2 is formed over the second substrate 120-2 in order to cover the third transparent electrode 130-3 and the fourth transparent electrode 130-4. The first substrate 120-1 and the second substrate 120-2 are arranged so that the first transparent electrode 130-1 and the second transparent electrode 130-2 on the first substrate 120-1 and the third transparent electrode 130-3 and the fourth transparent electrode 130-4 on the second substrate 120-2 face each other. Further, a first sealing member 150-1 is formed around each of the first substrate 120-1 and the second substrate 120-2. That is, the first substrate 120-1 and the second substrate 120-2 are bonded to each other via the first sealing member 150-1. Further, a liquid crystal is sealed in a space surrounded by the first substrate 120-1 (more specifically, the first alignment film 140-1), the second substrate 120-2 (more specifically, the second alignment film 140-2), and the first sealing member 150-1 to form a first liquid crystal layer 160-1.

The second liquid crystal cell 110-2 includes a third substrate 120-3 on which a fifth transparent electrode 130-5 and a sixth transparent electrode 130-6 are formed and a fourth substrate 120-4 on which a seventh transparent electrode 130-7 and an eighth transparent electrode 130-8 are formed. A third alignment film 140-3 is formed on the third substrate 120-3 in order to cover the fifth transparent electrode 130-5 and the sixth transparent electrode 130-6. Further, a fourth alignment film 140-4 is formed on the fourth substrate 120-4 in order to cover the seventh transparent electrode 130-7 and the eighth transparent electrode 130-8. The third substrate 120-3 and the fourth substrate 120-4 are arranged so that the fifth transparent electrode 130-5 and the sixth transparent electrode 130-6 on the third substrate 120-3 and the seventh transparent electrode 130-7 and the eighth transparent electrode 130-8 on the fourth substrate 120-4 face each other. Further, a second sealing member 150-2 is formed around each of the third substrate 120-3 and the fourth substrate 120-4. That is, the third substrate 120-3 and the fourth substrate 120-4 are bonded to each other via the second sealing member 150-2. Further, a liquid crystal is sealed in a space surrounded by the third substrate 120-3 (more specifically, the third alignment film 140-3), the fourth substrate 120-4 (more specifically, the fourth alignment film 140-4), and the second sealing member 150-2 to form a second liquid crystal layer 160-2.

The third liquid crystal cell 110-3 includes a fifth substrate 120-5 on which a ninth transparent electrode 130-9 and a tenth transparent electrode 130-10 are formed and a sixth substrate 120-6 on which an eleventh transparent electrode 130-11 and a twelfth transparent electrode 130-12 are formed. A fifth alignment film 140-5 is formed on the fifth substrate 120-5 in order to cover the ninth transparent electrode 130-9 and the tenth transparent electrode 130-10. Further, a sixth alignment film 140-6 is formed on the sixth substrate 120-6 in order to cover the eleventh transparent electrode 130-11 and the twelfth transparent electrode 130-12. The fifth substrate 120-5 and the sixth substrate 120-6 are arranged so that the ninth transparent electrode 130-9 and the tenth transparent electrode 130-10 on the fifth substrate 120-5 and the eleventh transparent electrode 130-11 and the twelfth transparent electrode 130-12 on the sixth substrate 120-6 face each other. Further, a third sealing member 150-3 is formed around each of the fifth substrate 120-5 and the sixth substrate 120-6. That is, the fifth substrate 120-5 and the sixth substrate 120-6 are bonded to each other via the third sealing member 150-3. Further, a liquid crystal is sealed in a space surrounded by the fifth substrate 120-5 (more specifically, the fifth alignment film 140-5), the sixth substrate 120-6 (more specifically, the sixth alignment film 140-6), and the third sealing member 150-3 to form a third liquid crystal layer 160-3.

The fourth liquid crystal cell 110-4 includes a seventh substrate 120-7 on which a thirteenth transparent electrode 130-13 and a fourteenth transparent electrode 130-14 are formed and an eighth substrate 120-8 on which a fifteenth transparent electrode 130-15 and a sixteenth transparent electrode 130-16 are formed. A seventh alignment film 140-7 is formed on the seventh substrate 120-7 in order to cover the thirteenth transparent electrode 130-13 and the fourteenth transparent electrode 130-14. Further, an eighth alignment film 140-8 is formed on the eighth substrate 120-8 in order to cover the fifteenth transparent electrode 130-15 and the sixteenth transparent electrode 130-16. The seventh substrate 120-7 and the eighth substrate 120-8 are arranged so that the thirteenth transparent electrode 130-13 and the fourteenth transparent electrode 130-14 on the seventh substrate 120-7 and the fifteenth transparent electrode 130-15 and the sixteenth transparent electrode 130-16 on the eighth substrate 120-8 face each other. Further, a fourth sealing member 150-4 is formed around each of the seventh substrate 120-7 and the eighth substrate 120-8. That is, the seventh substrate 120-7 and the eighth substrate 120-8 are bonded to each other via the fourth sealing member 150-4. Further, a liquid crystal is sealed in a space surrounded by the seventh substrate 120-7 (more specifically, the seventh alignment film 140-7), the eighth substrate 120-8 (more specifically, the eighth alignment film 140-8), and the fourth sealing member 150-4 to form a fourth liquid crystal layer 160-4.

The first liquid crystal cell 110-1, the second liquid crystal cell 110-2, the third liquid crystal cell 110-3, and the fourth liquid crystal cell 110-4 have the same basic configuration. However, the arrangement of the transparent electrodes 130 is different.

In the first liquid crystal cell 110-1, the first transparent electrode 130-1 and the second transparent electrode 130-2 extend in the y-axis direction, and the third transparent electrode 130-3 and the fourth transparent electrode 130-4 extend in the x-axis direction. Further, the first transparent electrode 130-1 and the second transparent electrode 130-2 are arranged alternately in a comb-like shape in the x-axis direction, and the third transparent electrode 130-3 and the fourth transparent electrode 130-4 are alternately arranged in a comb-teeth shape in the y-axis direction. In a plan view, although the extending direction (y-axis direction) of the first transparent electrode 130-1 and the second transparent electrode 130-2 is orthogonal to the extending direction (x-axis direction) of the third transparent electrode 130-3 and the fourth transparent electrode 130-4, they may intersect each other with a slight shift.

In the second liquid crystal cell 110-2, the fifth transparent electrode 130-5 and the sixth transparent electrode 130-6 extend in the y-axis direction, and the seventh transparent electrode 130-7 and the eighth transparent electrode 130-8 extend in the x-axis direction. Further, the fifth transparent electrode 130-5 and the sixth transparent electrode 130-6 are arranged alternately in a comb-like shape in the x-axis direction, and the seventh transparent electrode 130-7 and the eighth transparent electrode 130-8 are arranged alternately in a comb-like shape in the y-axis direction. In the plan view, although the extending direction (y-axis direction) of the fifth transparent electrode 130-5 and the sixth transparent electrode 130-6 is orthogonal to the extending direction (x-axis direction) of the seventh transparent electrode 130-7 and the eighth transparent electrode 130-8, they may intersect each other with a slight shift.

In the third liquid crystal cell 110-3, the ninth transparent electrode 130-9 and the tenth transparent electrode 130-10 extend in the x-axis direction, and the eleventh transparent electrode 130-11 and the twelfth transparent electrode 130-12 extend in the y-axis direction. Further, the ninth transparent electrode 130-9 and the tenth transparent electrode 130-10 are arranged alternately in a comb-like shape in the y-axis direction, and the eleventh transparent electrode 130-11 and the twelfth transparent electrode 130-12 are alternately arranged in a comb-teeth shape in the x-axis direction. In the plan view, although the extending direction (x-axis direction) of the ninth transparent electrode 130-9 and the tenth transparent electrode 130-10 is orthogonal to the extending direction (y-axis direction) of the eleventh transparent electrode 130-11 and the twelfth transparent electrode 130-12, they may intersect each other with a slight shift.

In the fourth liquid crystal cell 110-4, the thirteenth transparent electrode 130-13 and the fourteenth transparent electrode 130-14 extend in the x-axis direction, and the fifteenth transparent electrode 130-15 and the sixteenth transparent electrode 130-16 extend in the y-axis direction. Further, the thirteenth transparent electrode 130-13 and the fourteenth transparent electrode 130-14 are arranged alternately in a comb-like shape in the y-axis direction, and the fifteenth transparent electrode 130-15 and the sixteenth transparent electrode 130-16 are alternately arranged in a comb-teeth shape in the x-axis direction. In the plan view, although the extending direction (x-axis direction) of the thirteenth transparent electrode 130-13 and the fourteenth transparent electrode 130-14 is orthogonal to the extending direction (y-axis direction) of the fifteenth transparent electrode 130-15 and the sixteenth transparent electrode 130-16, they may intersect each other with a slight shift.

In the plan view, the first transparent electrode 130-1 of the first liquid crystal cell 110-1, the fifth transparent electrode 130-5 of the second liquid crystal cell 110-2, the eleventh transparent electrode 130-11 of the third liquid crystal cell 110-3, and the fifteenth transparent electrode 130-15 of the fourth liquid crystal cell 110-4 overlap each other so that their extending directions (y-axis direction) substantially match each other. However, the first liquid crystal cell 110-1 to the fourth liquid crystal cell 110-4 may be arranged so that the first transparent electrode 130-1, the fifth transparent electrode 130-5, the eleventh transparent electrode 130-11, and the fifteenth transparent electrode 130-15 overlap each other with a slight shift.

For example, a rigid substrate having light-transmitting properties such as a glass substrate, a quartz substrate, or a sapphire substrate is used as each of the first substrate 120-1 to the eighth substrate 120-8. Further, a flexible substrate having light-transmitting properties such as a polyimide resin substrate, an acrylic resin substrate, a siloxane resin substrate, or a fluorine resin substrate can also be used as each of the first substrate 120-1 to the eighth substrate 120-8.

Each of the first transparent electrode 130-1 to the sixteenth transparent electrode 130-16 functions as an electrode for forming an electric field in the liquid crystal layer 160. For example, a transparent conductive material such as indium tin oxide (ITO) or indium zinc oxide (IZO) is used for each of the first transparent electrode 130-1 to the sixteenth transparent electrode 130-16.

Each of the first liquid crystal layer 160-1 to the fourth liquid crystal layer 160-4 can refract transmitted light or change the polarization state of transmitted light according to the alignment state of the liquid crystal molecules. For example, nematic liquid crystal can be used as the liquid crystal of each of the first liquid crystal layer 160-1 to the fourth liquid crystal layer 160-4. Although a positive liquid crystal is adopted in the embodiment, it is also possible to adopt a configuration of a negative liquid crystal by changing the initial alignment direction of the liquid crystal molecules. Further, the liquid crystal preferably contains a chiral agent that imparts twist to the liquid crystal molecules.

Each of the first alignment film 140-1 to the eighth alignment film 140-8 aligns the liquid crystal molecules in the liquid crystal layer 113 in a predetermined direction. For example, a polyimide resin or the like can be used for each of the first alignment film 140-1 to the eighth alignment film 140-8. In addition, each of the first alignment film 140-1 to the eighth alignment film 114-2 may be imparted with alignment properties by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

An adhesive material containing epoxy resin, acrylic resin, or the like can be used for the first sealing member 150-1 to the fourth sealing member 150-4. The adhesive material may be of an ultraviolet curable type or a heat curable type.

The optical element 10 includes at least two liquid crystal cells (for example, the first liquid crystal cell 110-1 and the second liquid crystal cell 110-2), so that the light distribution of unpolarized light can be controlled. Therefore, it is not necessary to provide a pair of polarizing plates on the outer surface of each of the first substrate 120-1 of the first liquid crystal cell 110-1 and the eighth substrate 120-8 of the fourth liquid crystal cell 110-4.

[2. Control of Light Distribution by Optical Element 10]

Figure 3A:
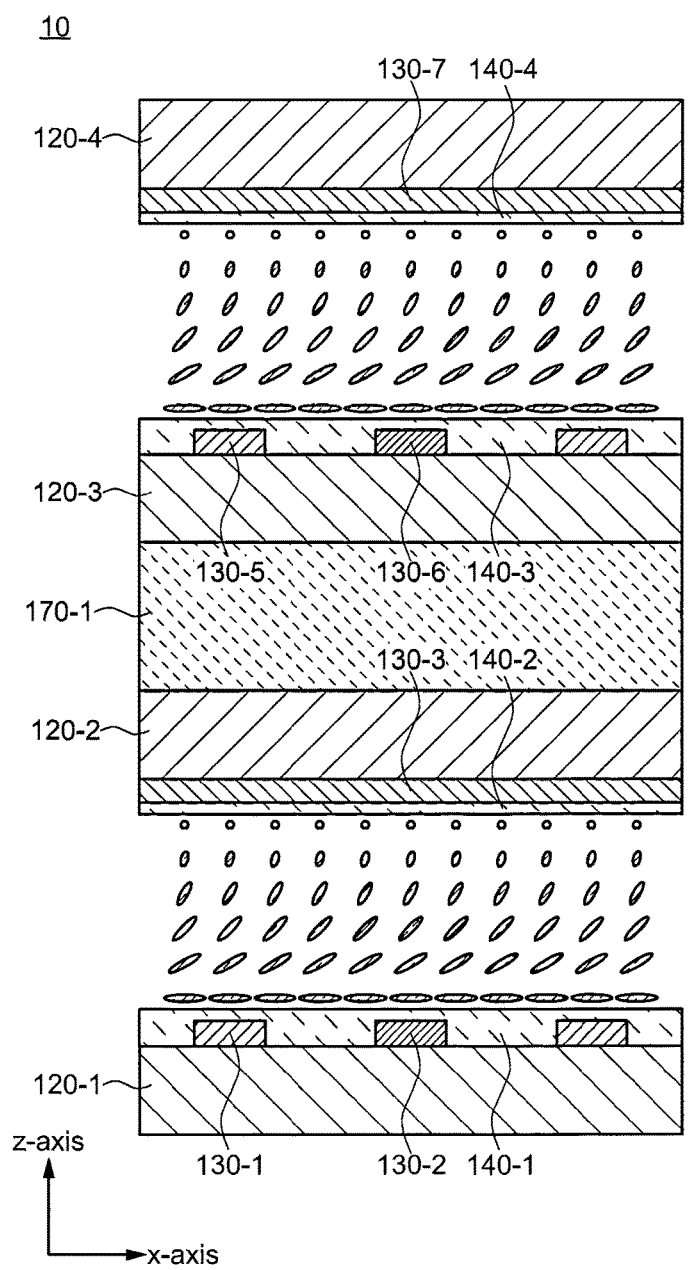
FIG. 3A is a schematic cross-sectional view illustrating the control of a light distribution by an optical element according to an embodiment of the present invention.
Figure 3A:
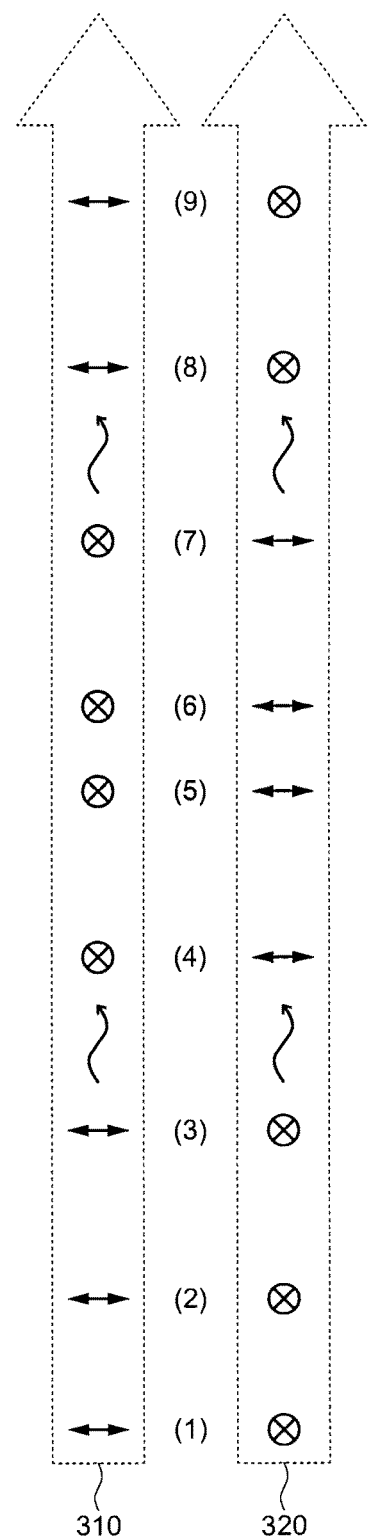
Figure 3B:
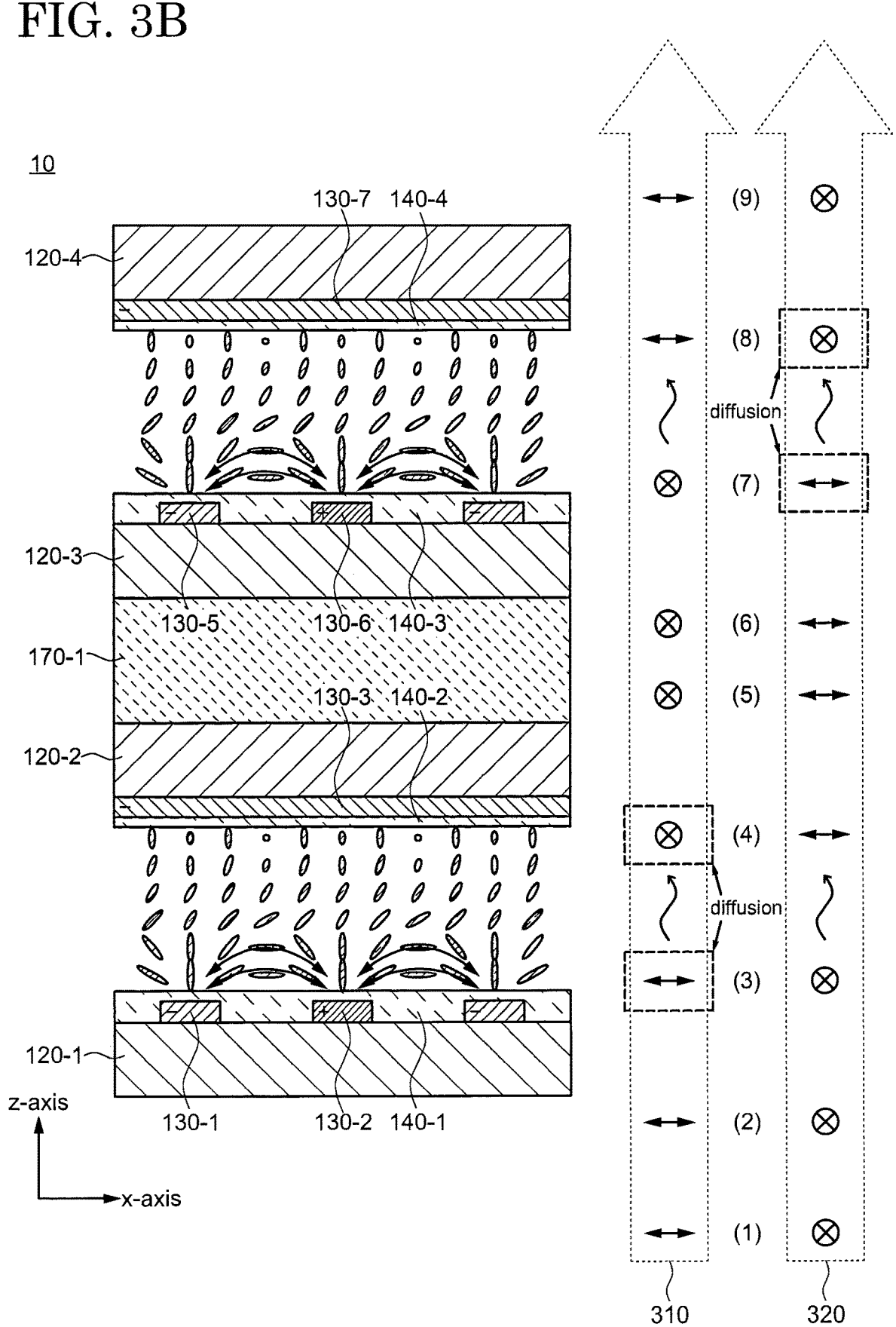
FIG. 3B is a schematic cross-sectional view illustrating the control of a light distribution by an optical element according to an embodiment of the present invention.

FIGS. 3A and 3B are schematic cross-sectional views illustrating the control of a light distribution by the optical element 10 according to an embodiment of the present invention. FIGS. 3A and 3B show a part of a cross-sectional view of the first liquid crystal cell 110-1 and the second liquid crystal cell 110-2 shown in FIG. 2A. FIG. 3A shows the optical element 10 in a state where no potential is supplied to the transparent electrodes 130, and FIG. 3B shows the optical element 10 in a state where the transparent electrodes 130 are supplied with a potential.

The alignment treatment in the x-axis direction is performed on the first alignment film 140-1. Thus, as shown in FIG. 3A, the long axes of the liquid crystal molecules on the side of the first substrate 120-1 in the first liquid crystal layer 160-1 are aligned along the x-axis direction. That is, the alignment direction of the liquid crystal molecules on the side of the first substrate 120-1 is orthogonal to the extending direction (y-axis direction) of the first transparent electrode 130-1 and the second transparent electrode 130-2. Further, the alignment treatment in the y-axis direction is performed on the second alignment film 140-2. Thus, as shown in FIG. 3A, the long axes of the liquid crystal molecules on the side of the second substrate 120-2 in the first liquid crystal layer 160-1 are aligned along the y-axis direction. That is, the alignment direction of the liquid crystal molecules on the side of the second substrate 120-2 is orthogonal to the extending direction (x-axis direction) of the third transparent electrode 130-3 and the fourth transparent electrode 130-4. Therefore, the liquid crystal molecules in the first liquid crystal layer 160-1 gradually change the direction of their long axes from the x-axis direction to the y-axis direction moving from the first substrate 120-1 to the second substrate 120-2, and are aligned in a state twisted by 90 degrees.

Since the liquid crystal molecules in the second liquid crystal layer 160-2 are also similar to the liquid crystal molecules in the first liquid crystal layer 160-1, the description thereof is omitted here.

When potentials are supplied to the transparent electrodes 130, the alignment of the liquid crystal molecules changes as shown in FIG. 3B. Here, it is described that a low potential is supplied to the first transparent electrode 130-1, the third transparent electrode 130-3, the fifth transparent electrode 130-5, and the seventh transparent electrode 130-7, and a high potential is supplied to the second transparent electrode 130-2, the fourth transparent electrode 130-4, the sixth transparent electrode 130-6, and the eighth transparent electrode 130-8. In addition, in FIG. 3B, for convenience, the low potential and the high potential are illustrated using symbols "−" and "+", respectively. Hereinafter, the electric field generated between adjacent transparent electrodes may be referred to as a lateral electric field.

As shown in FIG. 3B, the liquid crystal molecules on the side of the first substrate 120-1 are aligned as a whole in a convex arc shape along the x-axis direction with respect to the first substrate 120-1 due to the influence of the lateral electric field between the first transparent electrode 130-1 and the second transparent electrode 130-2. Similarly, the liquid crystal molecules on the side of the second substrate 120-2 are aligned as a whole in a convex arc shape along the y-axis direction with respect to the second substrate 120-2 due to the influence of the lateral electric field between the third transparent electrode 130-3 and the fourth transparent electrode 130-4. The alignment of the liquid crystal molecules located approximately in the center between the first transparent electrode 130-1 and the second transparent electrode 130-2 is hardly changed by any lateral electric field. Therefore, light incident on the first liquid crystal layer 160-1 is diffused in the x-axis direction according to the refractive index distribution of the liquid crystal molecules on the side of the first substrate 120-1 aligned in the convex arc shape along the x-axis direction, and then is diffused in the y-axis direction according to the refractive index distribution of the liquid crystal molecules on the side of the second substrate 120-2 aligned in the convex arc shape along the y-axis direction.

In addition, since the first substrate 120-1 and the second substrate 120-2 have a sufficiently large distance between the substrates, the lateral electric field between the first transparent electrode 130-1 and the second transparent electrode 130-2 of the first substrate 120-1 does not affect the alignment of the liquid crystal molecules on the second substrate 120-2, or is negligibly small. Similarly, the lateral electric field between the third transparent electrode 130-3 and the fourth transparent electrode 130-4 of the second substrate 120-2 does not affect the alignment of the liquid crystal molecules on the first substrate 120-1, or is negligibly small.

Since the alignment of the liquid crystal molecules in the second liquid crystal layer 160-2 in the case where potentials are supplied to the fifth transparent electrode 130-5 to the eighth transparent electrode 130-8 are also the same as the alignment of the liquid crystal molecules in the first liquid crystal layer 160-1, the description thereof is omitted here.

Next, the distribution of light passing through the optical element 10 is described. Light emitted from the light source has a polarization component in the x-axis direction (P-polarization component) and a polarization component in the y-axis direction (S-polarization component). However, for convenience, the polarization component of the light is divided into the P-polarization component and the S-polarization component that are perpendicular to each other in the following explanation. That is, the light emitted from the light source (see (1) in FIGS. 3A and 3B) includes a first polarized light 310 having the P-polarization component and a second polarized light 320 having the S-polarization component. In addition, an arrow symbol and a circle symbol with a cross in FIGS. 3A and 3B represent the P-polarization component and the S-polarization component, respectively.

After the first polarized light 310 is incident on the first substrate 120-1, the polarization component of the first polarized light 310 changes from the P-polarization component to the S-polarization component according to the twist of the alignment of the liquid crystal molecules as the first polarized light 310 approaches the second substrate 120-2 (see (2) to (4) in FIGS. 3A and 3B). More specifically, although the first polarized light 310 has the polarization axis in the x-axis direction on the side of the first substrate 120-1, the polarization axis of the first polarized light 310 is gradually changed in the process of passing in the thickness direction of the first liquid crystal layer 160-1 and the first polarized light 310 has the S-polarization component on the side of the second substrate 120-2. Then, the first polarized light 310 is emitted from the second substrate 120-2 (see (5) in FIGS. 3A and 3B).

Here, when a lateral electric field is generated between the first transparent electrode 130-1 and the second transparent electrode 130-2, the liquid crystal molecules on the side of the first substrate 120-1 are arranged along the x-axis in the convex arc shape due to the influence of the lateral electric field and the refractive index distribution changes. Therefore, the first polarized light 310 is diffused in the x-axis direction according to the refractive index distribution of the liquid crystal molecules. Further, when a lateral electric field is generated between the third transparent electrode 130-3 and the fourth transparent electrode 130-4, the liquid crystal molecules on the side of the second substrate 120-2 are arranged along the y-axis direction in the convex arc shape due to the influence of the lateral electric field and the refractive index distribution changes. Therefore, the first polarized light 310 is diffused in the y-axis direction according to the change in the refractive index distribution of the liquid crystal molecules.

Therefore, when no lateral electric field is generated (see FIG. 3A), the polarization component of the first polarized light 310 transmitted through the first liquid crystal cell 110-1 changes from the P polarization component to the S polarization component. On the other hand, when the lateral electric field is generated (see FIG. 3B), the polarization component of the first polarized light 310 transmitted through the first liquid crystal cell 110-1 changes from the P polarization component to the S polarization component, and the first polarized light 310 is diffused in the x-axis direction and in the y-axis direction.

After the second polarized light 320 is incident on the first substrate 120-1, the polarization component of the second polarized light 320 changes from the S-polarization component to the P-polarization component according to the twist of the alignment of the liquid crystal molecules as the second polarized light 320 approaches the second substrate 120-2 (see (2) to (4) in FIGS. 3A and 3B). More specifically, although the second polarized light 320 has the polarization axis in the y-axis direction on the side of the first substrate 120-1, the polarization axis of the second polarized light 320 is gradually changed in the process of passing in the thickness direction of the first liquid crystal layer 160-1 and the second polarized light 320 has the P-polarization component on the side of the second substrate 120-2, and then, the second polarized light 320 is emitted from the second substrate 120-2 (see (5) in FIGS. 3A and 3B).

Here, when a lateral electric field is generated between the first transparent electrode 130-1 and the second transparent electrode 130-2, the liquid crystal molecules on the side of the first substrate 120-1 are arranged along the x-axis in the convex arc shape due to the influence of the lateral electric field and the refractive index distribution changes. However, since the polarization axis of the second polarized light 320 is orthogonal to the alignment of the liquid crystal molecules on the side of the first substrate 120-1 side, the second polarized light 320 is not affected by the refractive index distribution of the liquid crystal molecules and passes without being diffused. Further, when a lateral electric field is generated between the third transparent electrode 130-3 and the fourth transparent electrode 130-4, the liquid crystal molecules on the side of the second substrate 120-2 are arranged in the y-axis direction in the convex arc shape due to the influence of the transverse electric field and the refractive index distribution changes. However, since the polarization axis of the second polarized light 320 is orthogonal to the alignment of the liquid crystal molecules on the side of the second substrate 120-2, the second polarized light 320 is not affected by the refractive index distribution of the liquid crystal molecules and passes without being diffused.

Therefore, not only when no lateral electric field is generated (see FIG. 3A) but also when a lateral electric field is generated (see FIG. 3B), the polarization component of the second polarized light 320 transmitted through the first liquid crystal cell 110-1 changes from the S-polarization component to the P-polarization component but the second polarized light 320 is not diffused.

The liquid crystal molecules in the second liquid crystal layer 160-2 of the second liquid crystal cell 110-2 also have the same refractive index distribution as the liquid crystal molecules in the first liquid crystal layer 160-1 of the first liquid crystal cell 110-1. However, since the polarization axes of the first polarized light 310 and the second polarized light 320 change by transmission through the first liquid crystal cell 110-1, the polarized light affected by the refractive index distribution of the liquid crystal molecules in the second liquid crystal layer 160-2 is reversed. That is, not only when no lateral electric field is generated (see FIG. 3A) but also when a lateral electric field is generated (see FIG. 3B), the polarization component of the first polarized light 310 transmitted through the second liquid crystal cell 110-2 changes from the S-polarization component to the P-polarization component but the first polarized light 310 is not diffused (see (6) to (8) in FIGS. 3A and 3B). On the other hand, when no lateral electric field is generated (see FIG. 3A), the polarization component of the second polarized light 320 transmitted through the second liquid crystal cell 110-2 only changes from the P-polarization component to the S-polarization component. However, when a lateral electric field is generated (see FIG. 3B), the polarization component of the second polarized light 320 transmitted through the second liquid crystal cell 110-2 changes from the P-polarization component to the S-polarization component, and the second polarized light 320 is diffused in the x-axis direction and in the y-axis direction.

As can be seen from the above, in the optical element 10, by stacking the two liquid crystal cells 110, the polarization direction of the light incident on the optical element 10 changes twice. Thus, the same polarization direction of light before entering the optical element 10 and after being emitted from the optical element 10 can be maintained (see (1) and (9) in FIGS. 3A and 3B). On the other hand, in the optical element 10, the refractive index distribution of the liquid crystal molecules in the liquid crystal layer 160 of the liquid crystal cell 110 can change and the transmitted light can be refracted. More specifically, the first liquid crystal cell 110 diffuses the light of the first polarized component 310 (P-polarization component) in the x-axis direction, the y-axis direction, or both the x-axis and y-axis directions, and the liquid crystal cell 120 diffuses the light of the second polarized component 320 (S-polarization component) in the x-axis direction, the y-axis direction, or both the x-axis and y-axis directions.

In FIGS. 3A and 3B, although only the first liquid crystal cell 110-1 and the second liquid crystal cell 110-2 are illustrated and the light distribution of the light transmitted through the first liquid crystal cell 110-1 and the second liquid crystal cell 110-2 is described, the same applies to the light distribution of light transmitted through the third liquid crystal cell 110-3 and the fourth liquid crystal cell 110-4. However, the third liquid crystal cell 110-3 and the fourth liquid crystal cell 110-4 are stacked and rotated by 90 degrees with respect to the first liquid crystal cell 110-1 and the second liquid crystal cell 110-2. As a result, the polarization components that act are swapped. That is, the third liquid crystal cell 110-3 can diffuse the second polarized light 320 (S-polarization component) in the x-axis direction, the y-axis direction, or both the x-axis and y-axis directions, and the fourth liquid crystal cell 110-4 can diffuse the first polarized light 310 (P-polarization component) in the x-axis direction, the y-axis direction, or both the x-axis and y-axis directions.

[3. Supplying Potential to Transparent Electrode of Optical Element 10]

Figure 4:
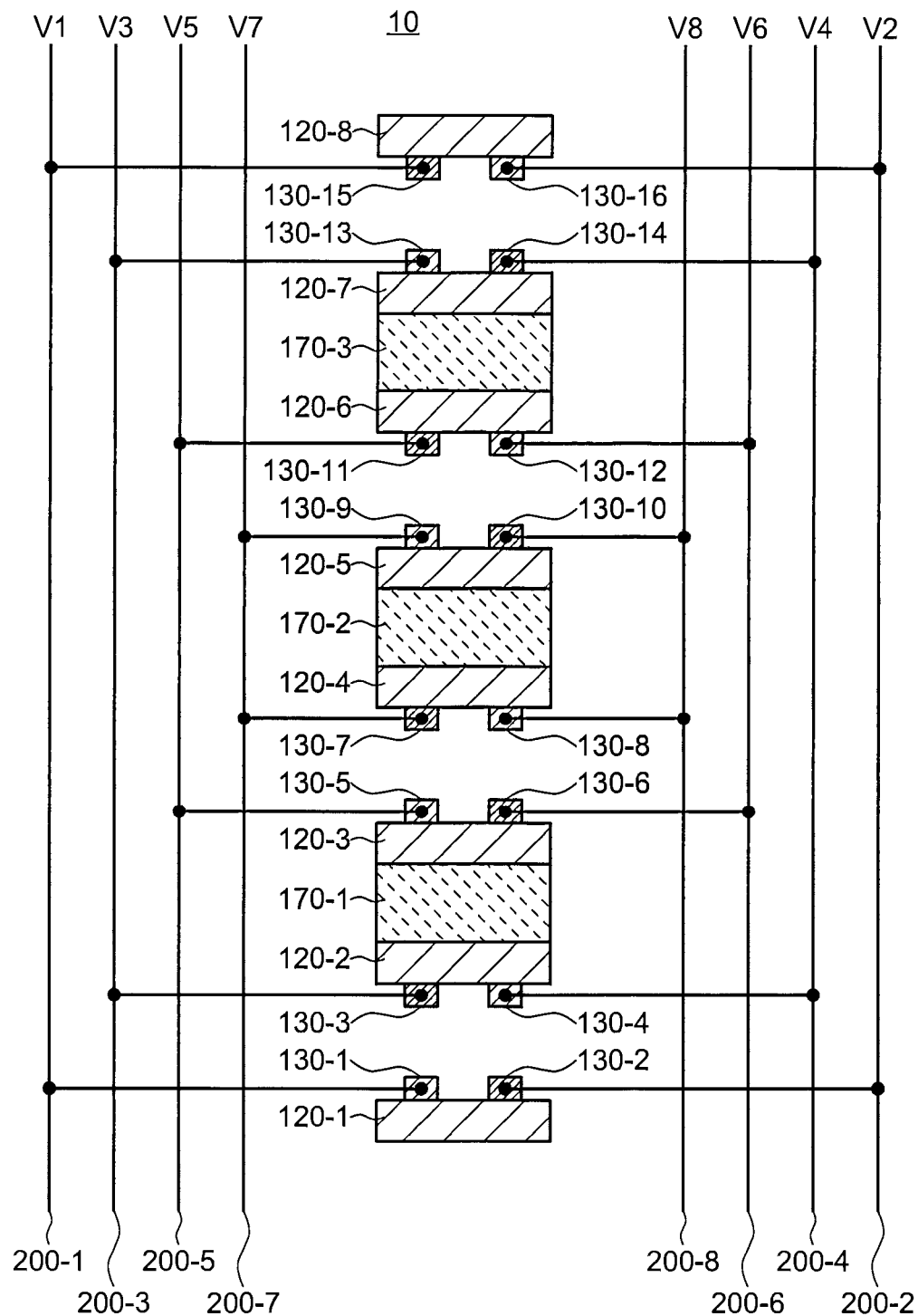
FIG. 4 is a schematic diagram illustrating a connection of a transparent electrode 130 of an optical element according to an embodiment of the present invention.

FIG. 4 is a schematic diagram illustrating the connection of the transparent electrode 130 of the optical element 10 according to an embodiment of the present invention.

The first transparent electrode 130-1 and the fifteenth transparent electrode 130-15 are connected to a first potential supply line 200-1 that supplies a first potential V1. That is, the first transparent electrode 130-1 and the fifteenth transparent electrode 130-15 are electrically connected to each other.

The second transparent electrode 130-2 and the sixteenth transparent electrode 130-16 are connected to a second potential supply line 200-2 that supplies the second potential V2. That is, the second transparent electrode 130-2 and the sixteenth transparent electrode 130-16 are electrically connected to each other.

The third transparent electrode 130-3 and the thirteenth transparent electrode 130-13 are connected to a third potential supply line 200-3 that supplies a third potential V3. That is, the third transparent electrode 130-3 and the thirteenth transparent electrode 130-13 are electrically connected to each other.

The fourth transparent electrode 130-4 and the fourteenth transparent electrode 130-14 are connected to a fourth potential supply line 200-4 that supplies a fourth potential V4. That is, the fourth transparent electrode 130-4 and the fourteenth transparent electrode 130-14 are electrically connected to each other.

The fifth transparent electrode 130-5 and the eleventh transparent electrode 130-11 are connected to a fifth potential supply line 200-5 that supplies a fifth potential V5. That is, the fifth transparent electrode 130-5 and the eleventh transparent electrode 130-11 are electrically connected to each other.

The sixth transparent electrode 130-6 and the twelfth transparent electrode 130-12 are connected to a sixth potential supply line 200-6 that supplies a sixth potential V6. That is, the sixth transparent electrode 130-6 and the twelfth transparent electrode 130-12 are electrically connected to each other.

The seventh transparent electrode 130-7 and the ninth transparent electrode 130-9 are connected to a seventh potential supply line 200-7 that supplies a seventh potential V7. That is, the seventh transparent electrode 130-7 and the ninth transparent electrode 130-9 are electrically connected to each other.

The eighth transparent electrode 130-8 and the tenth transparent electrode 130-10 are connected to an eighth potential supply line 200-8 that supplies an eighth potential V8. That is, the eighth transparent electrode 130-8 and the tenth transparent electrode 130-10 are electrically connected to each other.

The first potential V1 to the eighth potential V8 may be fixed potentials or variable potentials. The first potential supply line 200-1 to the eighth potential supply line 200-8 are supplied not only with the low potential and the high potential but also with an intermediate potential between the low potential and the high potential. That is, the first potential V1 to the eighth potential V8 include three potentials having different absolute values. Thereby, the optical element 10 can diffuse the light emitted from the light source in an elliptical shape with adjusted short and long axes. An example of the elliptical shape is described below.

Example 1. Elliptical Shape 1 with Focal Points on Y-Axis

The light distribution of the elliptical shape having focal points on the y-axis, that is, having the short axis in the x-axis direction and the long axis in the y-direction is described with reference to FIGS. 5A to 5C. In addition, for convenience, it is described that the low potential and the high potential are −5 V and 5 V, respectively. However, the low potential and the high potential are not limited thereto.

Figure 5A:
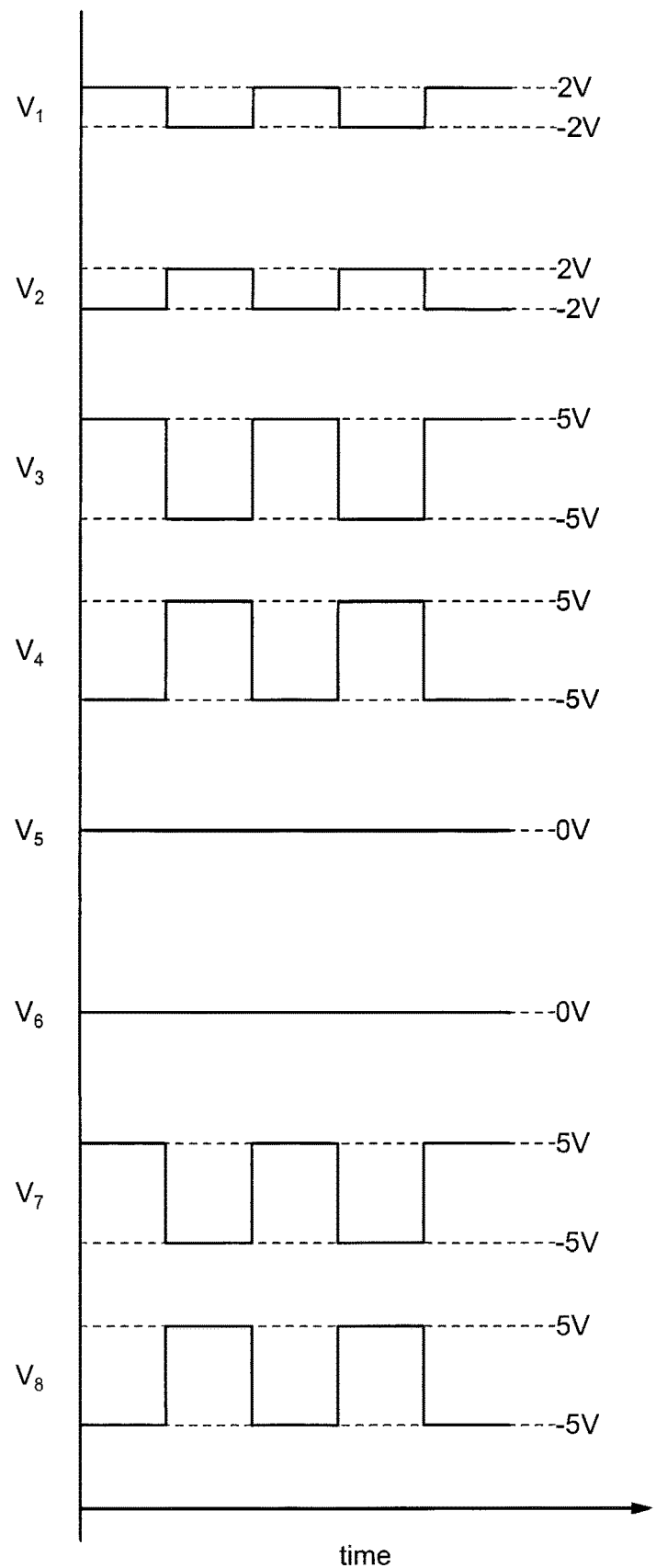
FIG. 5A is a timing chart showing potentials supplied to transparent electrodes of an optical element according to an embodiment of the present invention.

FIG. 5A is a timing chart showing potentials supplied to the transparent electrodes 130 of the optical element 10 according to an embodiment of the present invention.

The first potential V1 and the second potential V2 are variable potentials obtained by inverting the intermediate potential. That is, the first potential V1 and the second potential V2 are potentials in which −2 V and +2 V are repeated. However, the phases of the first potential V1 and the second potential V2 are reversed. Therefore, the absolute value of the potential difference between the first potential V1 and the second potential V2 is 4 V.

The third potential V3 and the fourth potential V4 are variable potentials in which the low potential and the high potential are inverted. That is, the third potential V3 and the fourth potential V4 are potentials in which −5 V and +5 V are repeated. However, the phases of the third potential V3 and the fourth potential V4 are reversed. Therefore, the absolute value of the potential difference between the third potential V3 and the fourth potential V4 is 10 V.

The fifth potential V5 and the sixth potential V6 are the intermediate fixed potentials. That is, the fifth potential V5 and the sixth potential V6 are 0V.

The seventh potential V7 and the eighth potential V8 are variable potentials in which the low potential and the high potential are inverted. That is, the seventh potential V7 and the eighth potential V8 are potentials in which −5 V and +5 V are repeated. However, the phases of the seventh potential V7 and the eighth potential V8 are reversed. Therefore, the absolute value of the potential difference between the seventh potential V7 and the eighth potential V8 is 10 V.

When the above-mentioned potentials are supplied to the transparent electrodes 130, the alignment state of the liquid crystal molecules in the liquid crystal layer 160 changes according to the potential difference. The light having polarization in the x-axis direction (for example, the P-polarization component) that enters the optical element 10 is diffused in the x-axis direction due to the potential difference (4 V) between the first transparent electrode 130-1 and the second transparent electrode 130-2 and the potential difference (4 V) between the fifteenth transparent electrode 130-15 and the sixteenth transparent electrode 130-16. Further, the light having polarization in the x-axis direction that enters the optical element 10 is diffused in the y-axis direction due to the potential difference (10 V) between the third transparent electrode 130-3 and the fourth transparent electrode 130-4 and the potential difference (10 V) between the thirteenth transparent electrode 130-13 and the fourteenth transparent electrode 130-14. Furthermore, the light having polarization in the y-axis direction (for example, the S-polarization component) that enters the optical element 10 is diffused in the y-axis direction due to the potential difference (10 V) between the seventh transparent electrode 130-7 and the eighth transparent electrode 130-8 and the potential difference (10 V) between the ninth transparent electrode 130-9 and the tenth transparent electrode 130-10. Thus, of the light incident on the optical element 10, a portion of the light having polarization in the x-axis direction is diffused in the x-axis direction, and the remaining light is diffused in the y-axis direction. Therefore, the light distribution of light transmitted through the optical element 10 has the light distribution having an elliptical shape with the short axis in the x-axis direction and the long axis in the y-axis direction.

In the timing chart shown in FIG. 5A, although the light having polarization in the x-axis direction is diffused in the x-axis direction, it is also possible to diffuse light having polarization in the y-axis direction in the x-axis direction. This is described below.

Figure 5B:
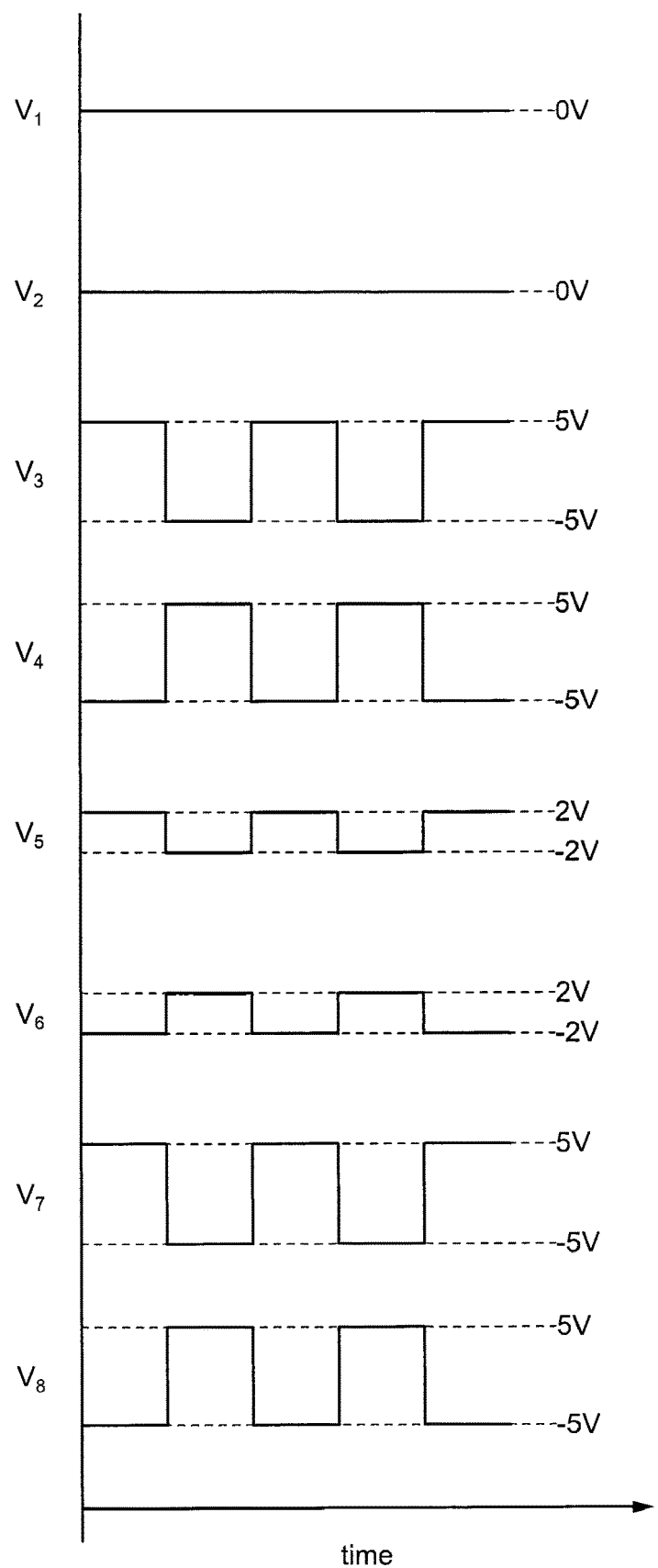
FIG. 5B is a timing chart showing potentials supplied to transparent electrodes of an optical element according to an embodiment of the present invention.

FIG. 5B is a timing chart showing potentials supplied to the transparent electrodes 130 of the optical element 10 according to an embodiment of the present invention.

The first potential V1 and the second potential V2 are the intermediate fixed potentials. That is, the first potential V1 and the second potential V2 are 0V.

The third potential V3 and the fourth potential V4 are variable potentials in which the low potential and the high potential are inverted. That is, the third potential V3 and the fourth potential V4 are potentials in which −5 V and +5 V are repeated. However, the phases of the third potential V3 and the fourth potential V4 are reversed. Therefore, the absolute value of the potential difference between the third potential V3 and the fourth potential V4 is 10 V.

The fifth potential V5 and the sixth potential V6 are variable potentials obtained by inverting the intermediate potential. That is, the fifth potential V5 and the sixth potential V6 are potentials in which −2 V and +2 V are repeated. However, the phases of the fifth potential V5 and the sixth potential V6 are reversed. Therefore, the absolute value of the potential difference between the fifth potential V5 and the sixth potential V6 is 4 V.

The seventh potential V7 and the eighth potential V8 are variable potentials in which the low potential and the high potential are inverted. That is, the seventh potential V7 and the eighth potential V8 are potentials in which −5 V and +5 V are repeated. However, the phases of the seventh potential V7 and the eighth potential V8 are reversed. Therefore, the absolute value of the potential difference between the seventh potential V7 and the eighth potential V8 is 10 V.

When the above-mentioned potentials are supplied to the transparent electrodes 130, the alignment state of the liquid crystal molecules in the liquid crystal layer 160 changes according to the potential difference. The light having polarization in the y-axis direction that enters the optical element 10 is diffused in the x-axis direction due to the potential difference (4 V) between the fifth transparent electrode 130-5 and the sixth transparent electrode 130-6 and the potential difference (4 V) between the eleventh transparent electrode 130-11 and the twelfth transparent electrode 130-12. Further, the light having polarization in the y-axis direction that enters the optical element 10 is diffused in the y-axis direction due to the potential difference (10 V) between the seventh transparent electrode 130-7 and the eighth transparent electrode 130-8 and the potential difference (10 V) between the ninth transparent electrode 130-9 and the tenth transparent electrode 130-10. Furthermore, the light having polarization in the x-axis direction that enters the optical element 10 is diffused in the y-axis direction due to the potential difference (10 V) between the third transparent electrode 130-3 and the fourth transparent electrode 130-4 and the potential difference (10 V) between the thirteenth transparent electrode 130-13 and the fourteenth transparent electrode 130-10. Thus, of the light incident on the optical element 10, a portion of the light having polarization in the y-axis direction is diffused in the x-axis direction, and the remaining light is diffused in the y-axis direction. Therefore, the light transmitted through the optical element 10 has the light distribution having an elliptical shape with the short axis in the x-axis direction and the long axis in the y-axis direction.

Figure 5C:
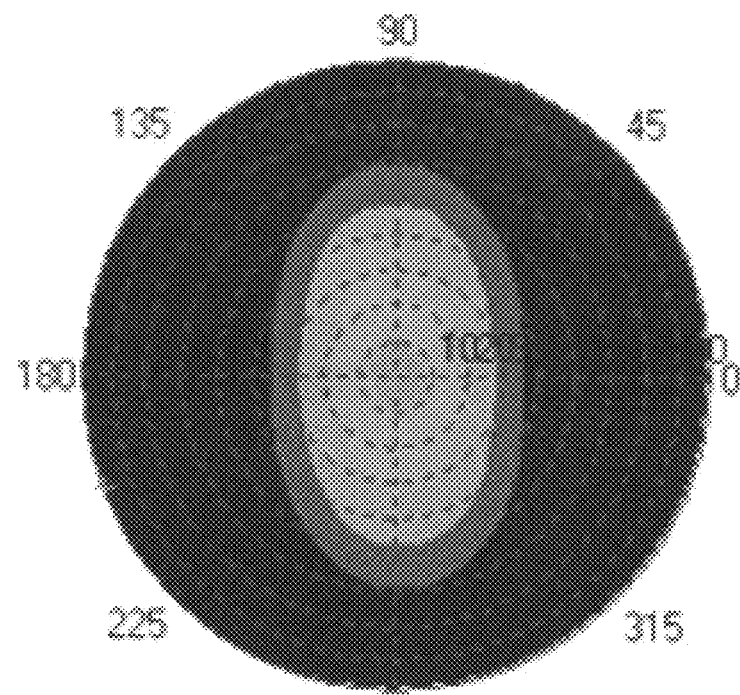
FIG. 5C shows a measurement result of an azimuth angle of light transmitted through an optical element according to an embodiment of the present invention.
Figure 5C:
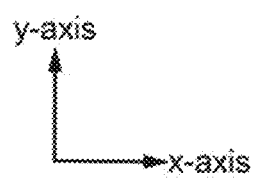

FIG. 5C shows the measurement result of an azimuth angle of light transmitted through the optical element 10 according to an embodiment of the present invention. When the manufactured optical element 10 was supplied with the potentials shown in the timing chart shown in FIG. 5A, the light distribution having an elliptical shape shown in FIG. 5C was measured.

Example 2. Elliptical Shape 2 with Focal Points on Y-Axis

The light distribution of the elliptical shape having focal points on the y-axis, that is, having the short axis in the x-axis direction and the long axis in the y-axis direction is described with reference to FIGS. 6A and 6B. In addition, the elliptical shape 2 is an ellipse that is closer to a circle than the elliptical shape 1.

Figure 6A:
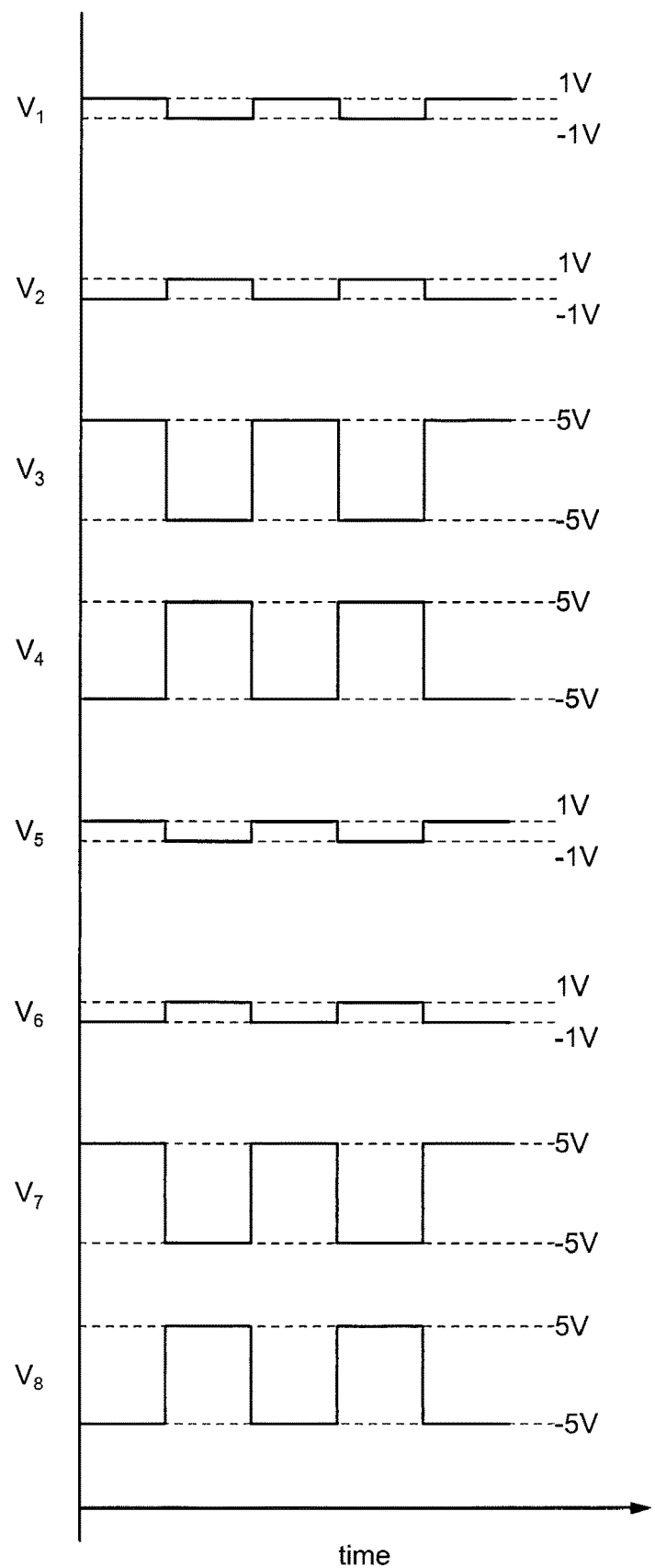
FIG. 6A is a timing chart showing potentials supplied to the transparent electrodes of an optical element according to an embodiment of the present invention.

FIG. 6A is a timing chart showing potentials supplied to the transparent electrodes 130 of the optical element 10 according to an embodiment of the present invention.

The first potential V1 and the second potential V2 are variable potentials obtained by inverting the intermediate potential. That is, the first potential V1 and the second potential V2 are potentials in which −1 V and +1 V are repeated. However, the phases of the first potential V1 and the second potential V2 are reversed. Therefore, the absolute value of the potential difference between the first potential V1 and the second potential V2 is 2 V.

The third potential V3 and the fourth potential V4 are variable potentials in which the low potential and the high potential are inverted. That is, the third potential V3 and the fourth potential V4 are potentials in which −5 V and +5 V are repeated. However, the phases of the third potential V3 and the fourth potential V4 are reversed. Therefore, the absolute value of the potential difference between the third potential V3 and the fourth potential V4 is 10 V.

The fifth potential V5 and the sixth potential V6 are variable potentials obtained by inverting the intermediate potential. That is, the fifth potential V5 and the sixth potential V6 are potentials in which −1 V and +1 V are repeated. However, the phases of the first potential V5 and the second potential V6 are reversed. Therefore, the absolute value of the potential difference between the fifth potential V5 and the sixth potential V6 is 2 V.

The seventh potential V7 and the eighth potential V8 are variable potentials in which the low potential and the high potential are inverted. That is, the seventh potential V7 and the eighth potential V8 are potentials in which −5 V and +5 V are repeated. However, the phases of the seventh potential V7 and the eighth potential V8 are reversed. Therefore, the absolute value of the potential difference between the seventh potential V7 and the eighth potential V8 is 10 V.

When the above-mentioned potentials are supplied to the transparent electrodes 130, the alignment state of the liquid crystal molecules in the liquid crystal layer 160 changes according to the potential difference. The light having polarization in the x-axis direction (for example, the P-polarization component) that enters the optical element 10 is slightly diffused in the x-axis direction due to the potential difference (2 V) between the first transparent electrode 130-1 and the second transparent electrode 130-2 and the potential difference (2 V) between the fifteenth transparent electrode 130-15 and the sixteenth transparent electrode 130-16. Further, the light having polarization in the x-axis direction that enters the optical element 10 is diffused in the y-axis direction due to the potential difference (10 V) between the third transparent electrode 130-3 and the fourth transparent electrode 130-4 and the potential difference (10 V) between the thirteenth transparent electrode 130-13 and the fourteenth transparent electrode 130-14. Further, the light having polarization in the y-axis direction (for example, the S-polarization component) that enters the optical element 10 is slightly diffused in the y-axis direction due to the potential difference (2 V) between the fifth transparent electrode 130-5 and the sixth transparent electrode 130-6 and the potential difference (2 V) between the eleventh transparent electrode 130-11 and the twelfth transparent electrode 130-12. Furthermore, the light having polarization in the y-axis direction that enters the optical element 10 is diffused in the y-axis direction due to the potential difference (10 V) between the seventh transparent electrode 130-7 and the eighth transparent electrode 130-8 and the potential difference (10 V) between the ninth transparent electrode 130-9 and the tenth transparent electrode 130-10. Thus, of the light incident on the optical element 10, a portion of the light having polarization in the x-axis direction and a portion of the light having polarization in the y-axis direction are diffused in the x-axis direction, and the remaining light is diffused in the y-axis direction. As a result, the elliptical shape 2 of the Example 2 increases the brightness of light diffused in the x-axis direction more than the elliptical shape 1 of the Example 1. Further, in the elliptical shape 4, when the brightness of the light in the x-axis direction is compared with the brightness of the light in the y-axis direction, the relative brightness difference in the x-axis direction and the y-axis direction becomes small. Therefore, the light transmitted through the optical element 10 has the light distribution having a near-circular elliptical shape with a short axis in the x-axis direction and a long axis in the y-axis direction.

Figure 6B:
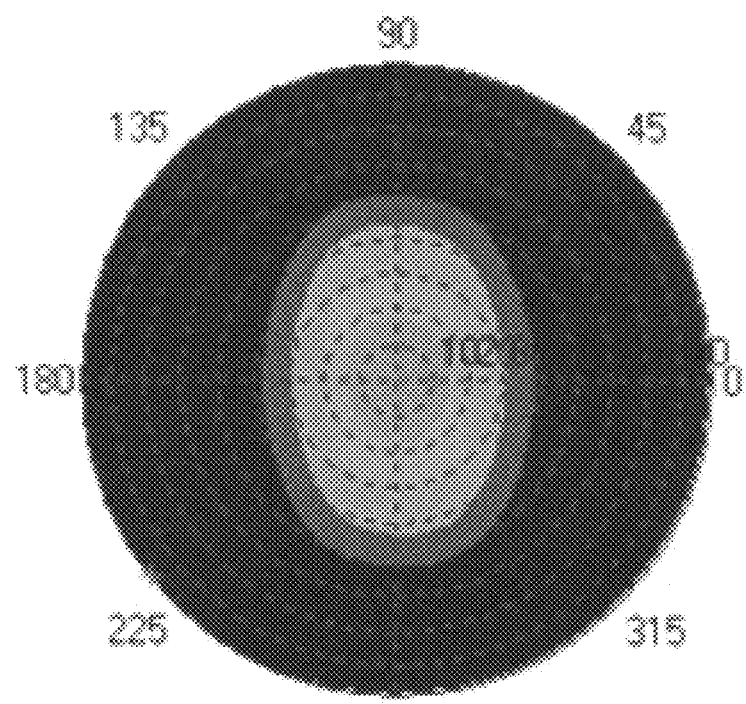
FIG. 6B shows a measurement result of an azimuth angle of light transmitted through an optical element according to an embodiment of the present invention.
Figure 6B:
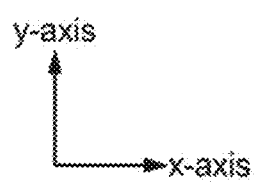

FIG. 6B shows the measurement result of an azimuth angle of light transmitted through the optical element 10 according to an embodiment of the present invention. When the manufactured optical element 10 was supplied with the potentials shown in the timing chart shown in FIG. 6A, the light distribution having an elliptical shape shown in FIG. 6B was measured. As described above, the Example 2 has the degree of diffusion in the x-axis direction higher than the Example 1. More specifically, not only a portion of the light having polarization in the x-axis direction but also a portion of light having polarization in the y-axis direction is diffused in the x-axis direction. Therefore, the light distribution of the Example 2 shown in FIG. 6B has an elliptical shape closer to a circle than the light distribution of the Example 1 shown in FIG. 5C.

Example 3. Elliptical Shape 3 with Focal Points on X-Axis

The light distribution of the elliptical shape having focal points on the x-axis, that is, having the long axis in the x-axis direction and the short axis in the y-axis direction is described with reference to FIGS. 7A to 7C.

Figure 7A:
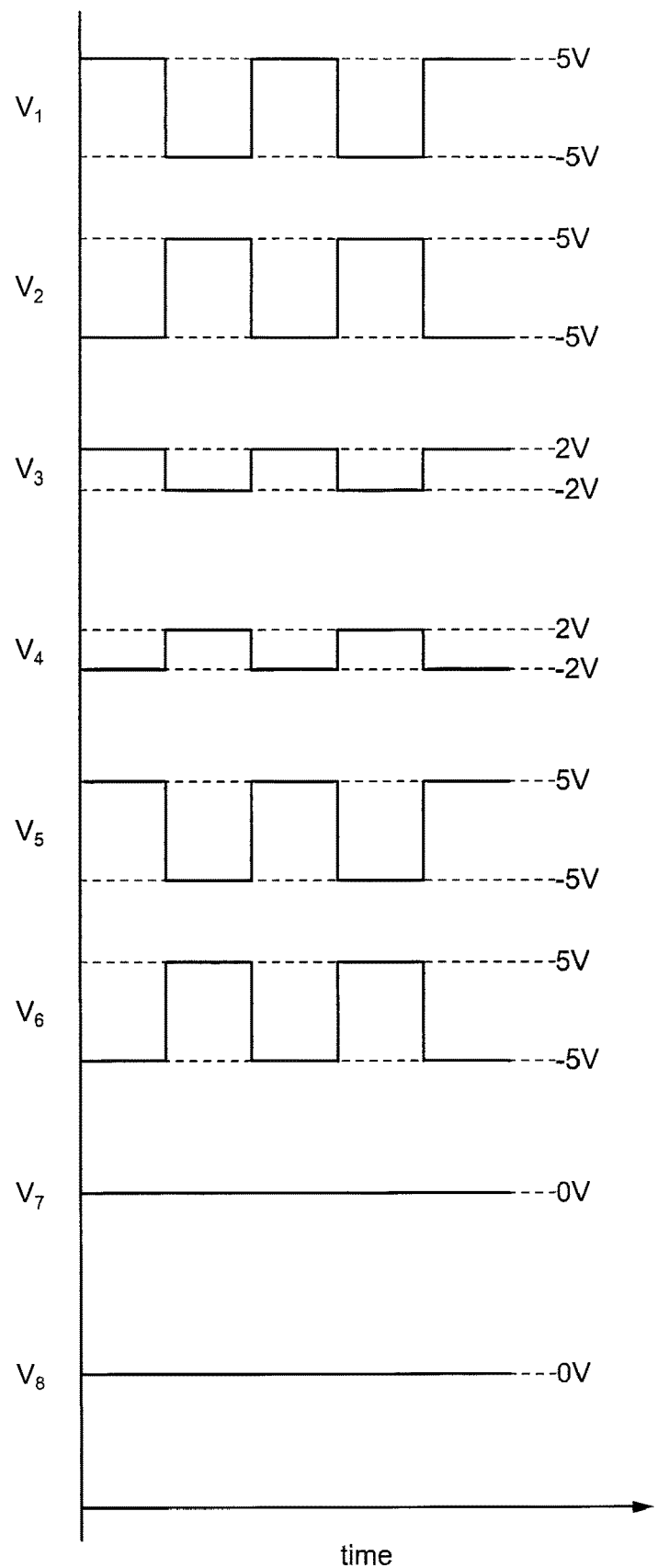
FIG. 7A is a timing chart showing potentials supplied to transparent electrodes of an optical element according to an embodiment of the present invention.

FIG. 7A is a timing chart showing potentials supplied to the transparent electrodes 130 of the optical element 10 according to an embodiment of the present invention.

The first potential V1 and the second potential V2 are variable potentials in which the low potential and the high potential are inverted. That is, the first potential V1 and the second potential V2 are potentials in which −5 V and +5 V are repeated. However, the phases of the first potential V1 and the second potential V2 are reversed. Therefore, the absolute value of the potential difference between the first potential V1 and the second potential V2 is 10 V.

The third potential V3 and the fourth potential V4 are variable potentials obtained by inverting the intermediate potential. That is, the third potential V3 and the fourth potential V4 are potentials in which −2 V and +2 V are repeated. However, the phases of the third potential V3 and the fourth potential V4 are reversed. Therefore, the absolute value of the potential difference between the third potential V3 and the fourth potential V4 is 4 V.

The fifth potential V5 and the sixth potential V6 are variable potentials in which the low potential and the high potential are inverted. That is, the fifth potential V5 and the sixth potential V6 are potentials in which −5 V and +5 V are repeated. However, the phases of the fifth potential V5 and the sixth potential V6 are reversed. Therefore, the absolute value of the potential difference between the fifth potential V5 and the sixth potential V6 is 10 V.

The seventh potential V7 and the eighth potential V8 are the intermediate fixed potentials. That is, the seventh potential V7 and the eighth potential V8 are 0V.

When the above-mentioned potentials are supplied to the transparent electrodes 130, the alignment state of the liquid crystal molecules in the liquid crystal layer 160 changes according to the potential difference. The light having polarization in the x-axis direction (for example, the P-polarization component) that enters the optical element 10 is diffused in the y-axis direction due to the potential difference (4 V) between the third transparent electrode 130-3 and the fourth transparent electrode 130-4 and the potential difference (4 V) between the thirteenth transparent electrode 130-13 and the fourteenth transparent electrode 130-14. Further, the light having polarization in the x-axis direction that enters the optical element 10 is diffused in the x-axis direction due to the potential difference (10 V) between the first transparent electrode 130-1 and the second transparent electrode 130-2 and the potential difference (10 V) between the fifteenth transparent electrode 130-15 and the sixteenth transparent electrode 130-16. Furthermore, the light having polarization in the y-axis direction (for example, the S-polarization component) that enters the optical element 10 is diffused in the x-axis direction due to the potential difference (10 V) between the fifth transparent electrode 130-5 and the sixth transparent electrode 130-6 and the potential difference (10 V) between the eleventh transparent electrode 130-11 and the twelfth transparent electrode 130-12. Thus, of the light incident on the optical element 10, a portion of the light having polarization in the x-axis direction is diffused in the y-axis direction, and the remaining light is diffused in the x-axis direction. Therefore, the light transmitted through the optical element 10 has the light distribution having an elliptical shape with the long axis in the x-axis direction and the short axis in the y-axis direction.

In the timing chart shown in FIG. 7A, although the light having polarization in the x-axis direction is diffused in the y-axis direction, it is also possible to diffuse light having polarization in the y-axis direction in the y-axis direction. This is described below.

Figure 7B:
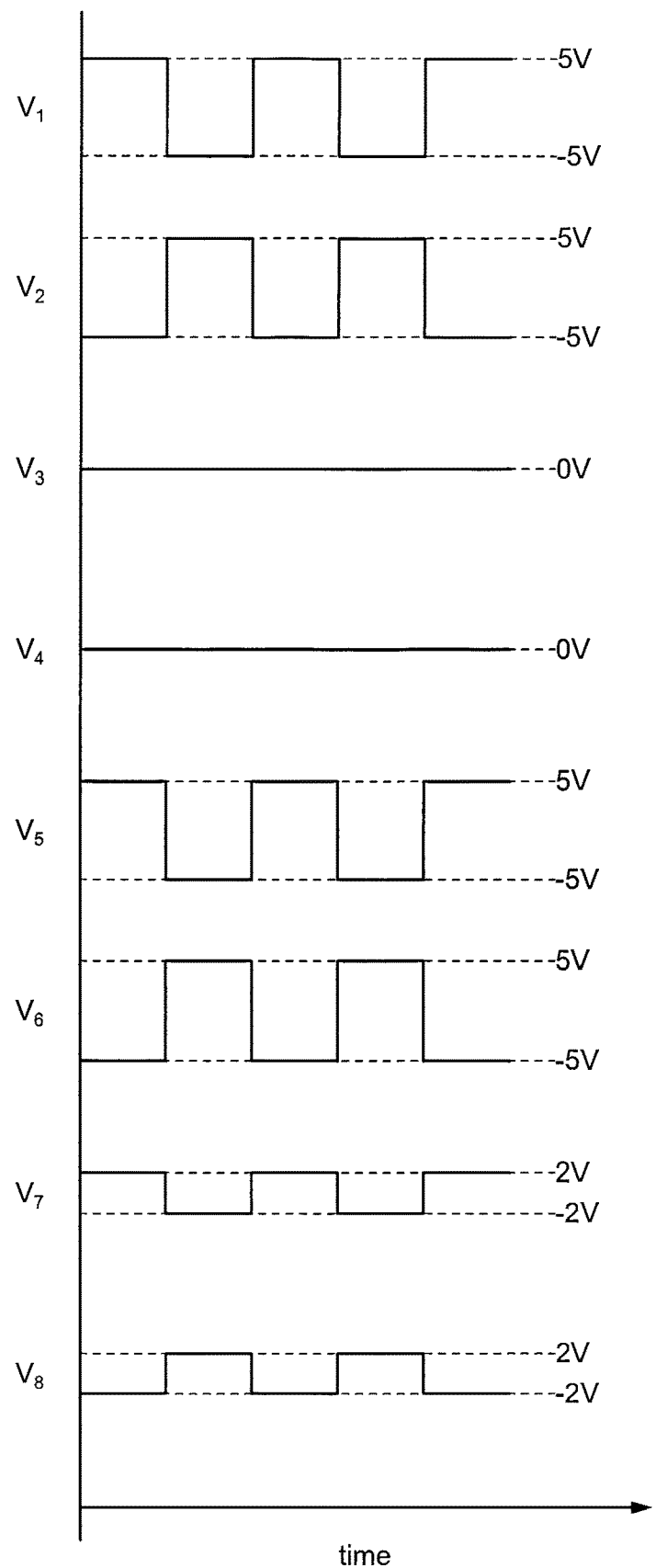
FIG. 7B is a timing chart showing potentials supplied to transparent electrodes of an optical element according to an embodiment of the present invention.

FIG. 7B is a timing chart showing potentials supplied to the transparent electrodes 130 of the optical element 10 according to an embodiment of the present invention.

The first potential V1 and the second potential V2 are variable potentials in which the low potential and the high potential are inverted. That is, the first potential V1 and the second potential V2 are potentials in which −5 V and +5 V are repeated. However, the phases of the first potential V1 and the second potential V2 are reversed. Therefore, the absolute value of the potential difference between the first potential V1 and the second potential V2 is 10 V.

The third potential V3 and the fourth potential V4 are the intermediate fixed potentials. That is, the third potential V3 and the fourth potential V4 are 0V.

The fifth potential V5 and the sixth potential V6 are variable potentials in which the low potential and the high potential are inverted. That is, the fifth potential V5 and the sixth potential V6 are potentials in which −5 V and +5 V are repeated. However, the phases of the fifth potential V5 and the sixth potential V6 are reversed. Therefore, the absolute value of the potential difference between the fifth potential V5 and the sixth potential V6 is 10 V.

The seventh potential V7 and the eighth potential V8 are variable potentials obtained by inverting the intermediate potential. That is, the seventh potential V7 and the eighth potential V8 are potentials in which −2 V and +2 V are repeated. However, the phases of the seventh potential V7 and the eighth potential V8 are reversed. Therefore, the absolute value of the potential difference between the seventh potential V7 and the eighth potential V8 is 4 V.

When the above-mentioned potentials are supplied to the transparent electrodes 130, the alignment state of the liquid crystal molecules in the liquid crystal layer 160 changes according to the potential difference. The light having polarization in the y-axis direction that enters the optical element 10 is diffused in the y-axis direction due to the potential difference (4 V) between the seventh transparent electrode 130-7 and the eighth transparent electrode 130-8 and the potential difference (4 V) between the ninth transparent electrode 130-9 and the tenth transparent electrode 130-10. Further, the light having polarization in the y-axis direction that enters the optical element 10 is diffused in the y-axis direction due to the potential difference (10 V) between the fifth transparent electrode 130-5 and the sixth transparent electrode 130-6 and the potential difference (10 V) between the eleventh transparent electrode 130-11 and the twelfth transparent electrode 130-12. Furthermore, the light having polarization in the x-axis direction that enters the optical element 10 is diffused in the x-axis direction due to the potential difference (10 V) between the first transparent electrode 130-1 and the second transparent electrode 130-2 and the potential difference (10 V) between the fifteenth transparent electrode 130-15 and the sixteenth transparent electrode 130-16. Thus, of the light incident on the optical element 10, a portion of the light having polarization in the y-axis direction is diffused in the y-axis direction, and the remaining light is diffused in the x-axis direction. Therefore, the light transmitted through the optical element 10 has the light distribution having an elliptical shape with the long axis in the x-axis direction and the short axis in the y-axis direction.

Figure 7C:
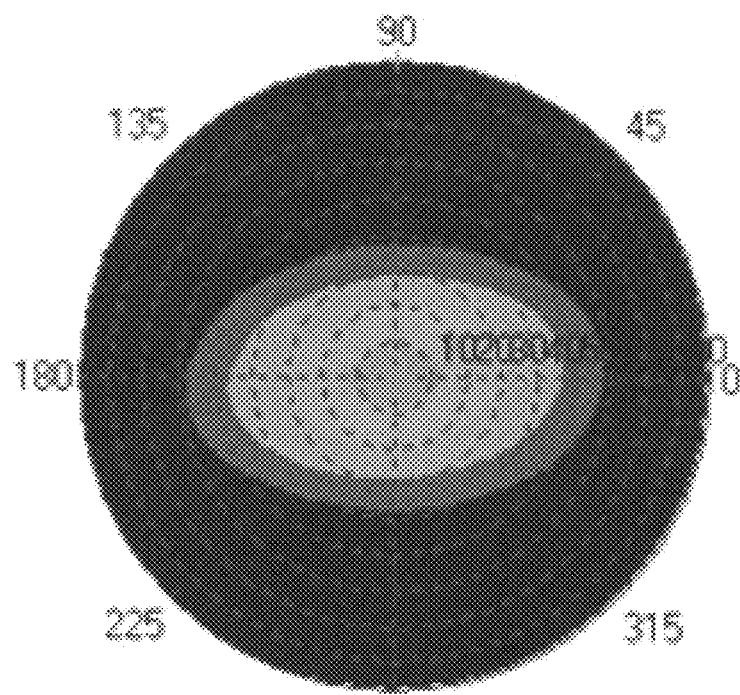
FIG. 7C shows a measurement result of an azimuth angle of light transmitted through an optical element according to an embodiment of the present invention.
Figure 7C:
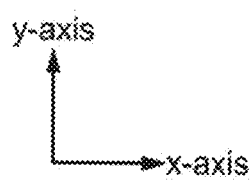

FIG. 7C shows the measurement result of an azimuth angle of light transmitted through the optical element 10 according to an embodiment of the present invention. When the manufactured optical element 10 was supplied with the potentials shown in the timing chart shown in FIG. 7A, the light distribution having an elliptical shape shown in FIG. 7C was measured.

Example 4. Elliptical Shape 4 with Focal Points on X-axis

The light distribution of the elliptical shape having focal points on the y-axis, that is, having the long axis in the x-axis direction and the short axis in the y-axis direction is described with reference to FIGS. 8A and 8B. In addition, the elliptical shape 4 is an ellipse that is closer to a circle than the elliptical shape 4.

Figure 8A:
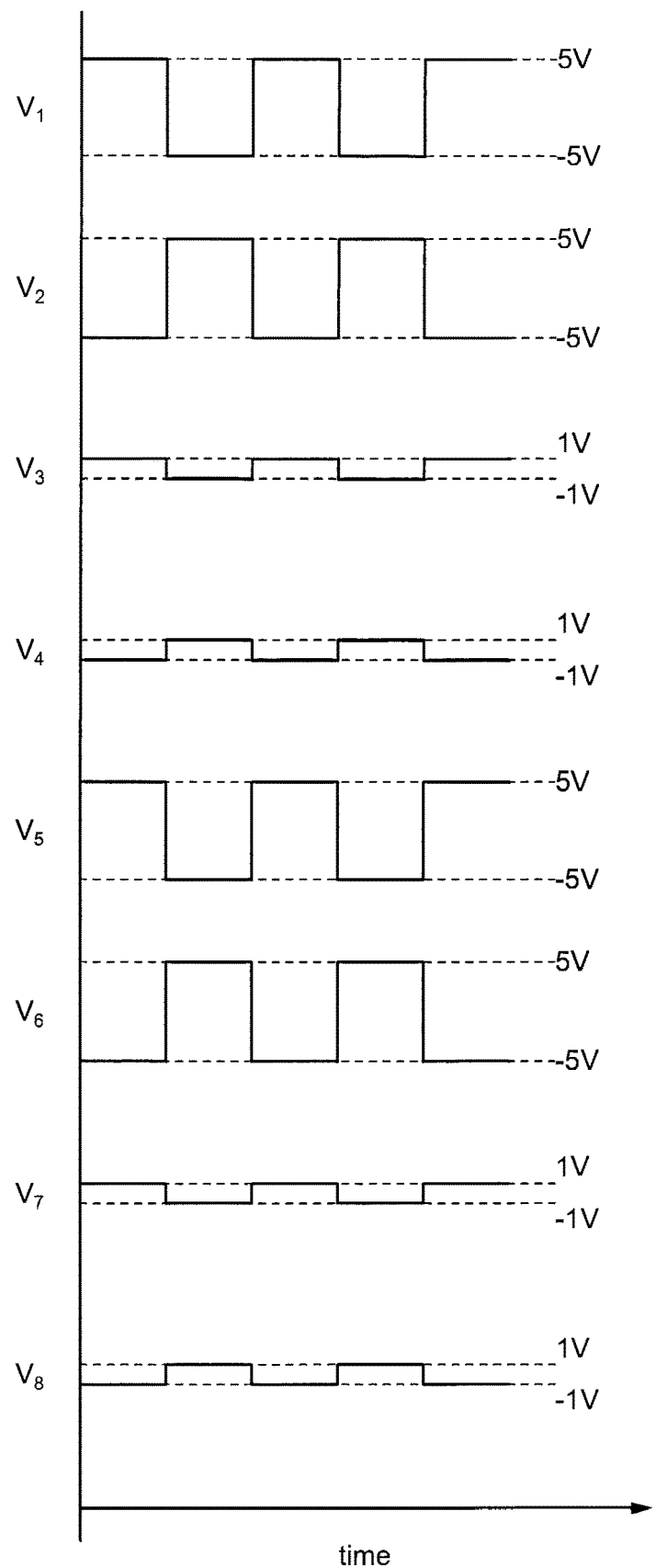
FIG. 8A is a timing chart showing potentials supplied to the transparent electrodes of an optical element according to an embodiment of the present invention.

FIG. 8A is a timing chart showing potentials supplied to the transparent electrodes 130 of the optical element 10 according to an embodiment of the present invention.

The first potential V1 and the second potential V2 are variable potentials in which the low potential and the high potential are inverted. That is, the first potential V1 and the second potential V2 are potentials in which −5 V and +5 V are repeated. However, the phases of the first potential V1 and the second potential V2 are reversed. Therefore, the absolute value of the potential difference between the first potential V1 and the second potential V2 is 10 V.

The third potential V3 and the fourth potential V4 are variable potentials obtained by inverting the intermediate potential. That is, the third potential V3 and the fourth potential V4 are potentials in which −1 V and +1 V are repeated. However, the phases of the third potential V3 and the fourth potential V4 are reversed. Therefore, the absolute value of the potential difference between the third potential V3 and the fourth potential V4 is 2 V.

The fifth potential V5 and the sixth potential V6 are variable potentials in which the low potential and the high potential are inverted. That is, the fifth potential V5 and the sixth potential V6 are potentials in which −5 V and +5 V are repeated. However, the phases of the fifth potential V5 and the sixth potential V6 are reversed. Therefore, the absolute value of the potential difference between the fifth potential V5 and the sixth potential V6 is 10 V.

The seventh potential V7 and the eighth potential V8 are variable potentials obtained by inverting the intermediate potential. That is, the seventh potential V7 and the eighth potential V8 are potentials in which −1 V and +1 V are repeated. However, the phases of the seventh potential V7 and the eighth potential V8 are reversed. Therefore, the absolute value of the potential difference between the seventh potential V7 and the eighth potential V8 is 2 V.

When the above-mentioned potentials are supplied to the transparent electrodes 130, the alignment state of the liquid crystal molecules in the liquid crystal layer 160 changes according to the potential difference. The light having polarization in the x-axis direction (for example, the P-polarization component) that enters the optical element 10 is slightly diffused in the x-axis direction due to the potential difference (2 V) between the third transparent electrode 130-3 and the fourth transparent electrode 130-4 and the potential difference (2 V) between the thirteenth transparent electrode 130-13 and the fourteenth transparent electrode 130-14. Further, the light having polarization in the x-axis direction that enters the optical element 10 is diffused in the y-axis direction due to the potential difference (10 V) between the first transparent electrode 130-1 and the second transparent electrode 130-2 and the potential difference (10 V) between the fifteenth transparent electrode 130-15 and the sixteenth transparent electrode 130-16. Further, the light having polarization in the y-axis direction (for example, the S-polarization component) that enters the optical element 10 is slightly diffused in the y-axis direction due to the potential difference (2 V) between the seventh transparent electrode 130-7 and the eighth transparent electrode 130-8 and the potential difference (2 V) between the ninth transparent electrode 130-9 and the tenth transparent electrode 130-12. Furthermore, the light having polarization in the y-axis direction that enters the optical element 10 is diffused in the y-axis direction due to the potential difference (10 V) between the fifth transparent electrode 130-5 and the sixth transparent electrode 130-6 and the potential difference (10 V) between the eleventh transparent electrode 130-11 and the twelfth transparent electrode 130-12. Thus, of the light incident on the optical element 10, a portion of the light having polarization in the x-axis direction and a portion of the light having polarization in the y-axis direction are diffused in the y-axis direction, and the remaining light is diffused in the x-axis direction. As a result, the elliptical shape 4 of the Example 4 increases the brightness of light diffused in the y-axis direction more than the elliptical shape 3 of the Example 3. Further, in the elliptical shape 4, when the brightness of the light in the x-axis direction is compared with the brightness of the light in the y-axis direction, the relative brightness difference in the x-axis direction and the y-axis direction becomes small. Therefore, the light transmitted through the optical element 10 has the light distribution having a near-circular elliptical shape with a long axis in the x-axis direction and a short axis in the y-axis direction.

Figure 8B:
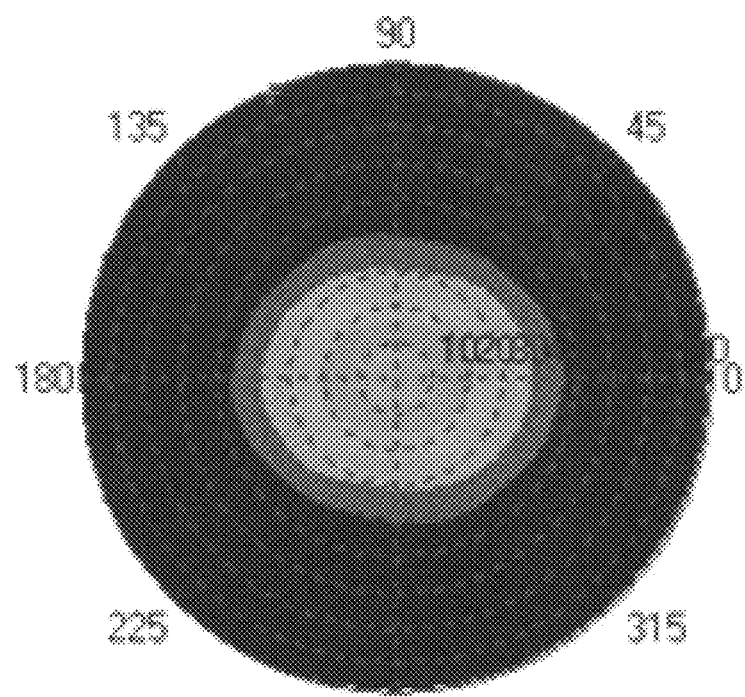
FIG. 8B shows a measurement result of an azimuth angle of light transmitted through an optical element according to an embodiment of the present invention.
Figure 8B:
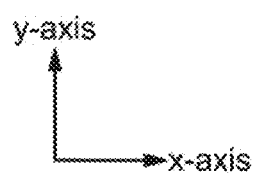

FIG. 8B shows the measurement result of an azimuth angle of light transmitted through the optical element 10 according to an embodiment of the present invention. When the manufactured optical element 10 was supplied with the potentials shown in the timing chart shown in FIG. 8A, the light distribution having an elliptical shape shown in FIG. 8B was measured. As described above, the Example 4 has the degree of diffusion in the y-axis direction higher than the Example 3. More specifically, not only a portion of the light having polarization in the y-axis direction but also a portion of light having polarization in the x-axis direction is diffused in the y-axis direction. Therefore, the light distribution of the Example 4 shown in FIG. 8B has an elliptical shape closer to a circle than the light distribution of the Example 3 shown in FIG. 7C.

As described above, according to the optical element 10 according to an embodiment of the present invention, the lengths of the short axis and the long axis can be controlled in a light distribution having an elliptical shape, which is an anisotropic shape.

Second Embodiment

In the optical element 10, it is possible to control a light distribution having shapes other than the elliptical shape. Therefore, for an example of a light distribution having a shape other than the elliptical shape, a light distribution having a cross shape in which the length in the x-axis direction and the length in the y-axis direction are different from each other is described below. In addition, when a configuration of this embodiment is similar to the configuration of the First Embodiment, the description of the configuration may be omitted.

Example 1. Cross Shape 1 with Longer Length in Y-Axis Direction than in X-Axis Direction The light distribution of the cross shape with a longer length in the y-axis direction than in the x-axis direction is described with reference to FIGS. 9A to 9C.

Figure 9A:
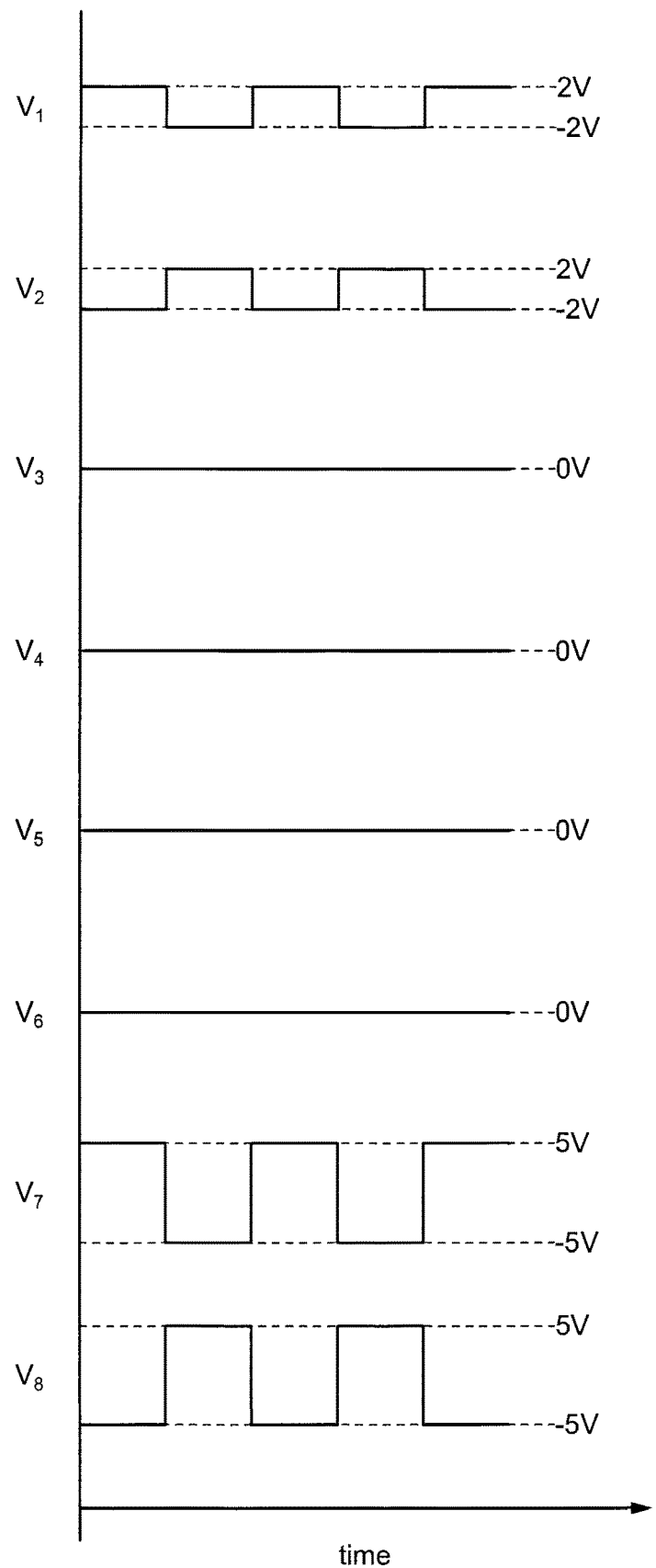
FIG. 9A is a timing chart showing potentials supplied to transparent electrodes of an optical element according to an embodiment of the present invention.

FIG. 9A is a timing chart showing potentials supplied to the transparent electrodes 130 of the optical element 10 according to an embodiment of the present invention.

The first potential V1 and the second potential V2 are variable potentials obtained by inverting the intermediate potential. That is, the first potential V1 and the second potential V2 are potentials in which −2 V and +2 V are repeated. However, the phases of the first potential V1 and the second potential V2 are reversed. Therefore, the absolute value of the potential difference between the first potential V1 and the second potential V2 is 4 V.

The third potential V3 and the fourth potential V4 are the intermediate fixed potentials. That is, the third potential V3 and the fourth potential V4 are 0V.

The fifth potential V5 and the sixth potential V6 are the intermediate fixed potentials. That is, the fifth potential V5 and the sixth potential V6 are 0V.

The seventh potential V7 and the eighth potential V8 are variable potentials in which the low potential and the high potential are inverted. That is, the seventh potential V7 and the eighth potential V8 are potentials in which −5 V and +5 V are repeated. However, the phases of the seventh potential V7 and the eighth potential V8 are reversed. Therefore, the absolute value of the potential difference between the seventh potential V7 and the eighth potential V8 is 10 V.

When the above-mentioned potentials are supplied to the transparent electrodes 130, the alignment state of the liquid crystal molecules in the liquid crystal layer 160 changes according to the potential difference. The light having polarization in the x-axis direction (for example, the P-polarization component) that enters the optical element 10 is diffused in the x-axis direction due to the potential difference (4 V) between the first transparent electrode 130-1 and the second transparent electrode 130-2 and the potential difference (4 V) between the fifteenth transparent electrode 130-15 and the sixteenth transparent electrode 130-16. Further, the light having polarization in the y-axis direction (for example, the S-polarization component) that enters the optical element 10 is diffused in the y-axis direction due to the potential difference (10 V) between the seventh transparent electrode 130-7 and the eighth transparent electrode 130-8 and the potential difference (10 V) between the ninth transparent electrode 130-9 and the tenth transparent electrode 130-10. Thus, of the light incident on the optical element 10, a portion of the light having polarization in the x-axis direction is diffused in the x-axis direction, and the light having polarization in the y-axis direction is diffused in the y-axis direction. In this way, the light distribution of the cross shape is realized by diffusing one polarization component only in the x-axis direction and diffusing the other polarization component only in the y-axis direction. Further, when the potential difference between each electrode is controlled, the length of the light distribution in each direction of the cross shape is adjusted.

In the timing chart shown in FIG. 9A, although the light having polarization in the x-axis direction is diffused in the x-axis direction, it is also possible to diffuse light having polarization in the y-axis direction in the x-axis direction. This is described below.

Figure 9B:
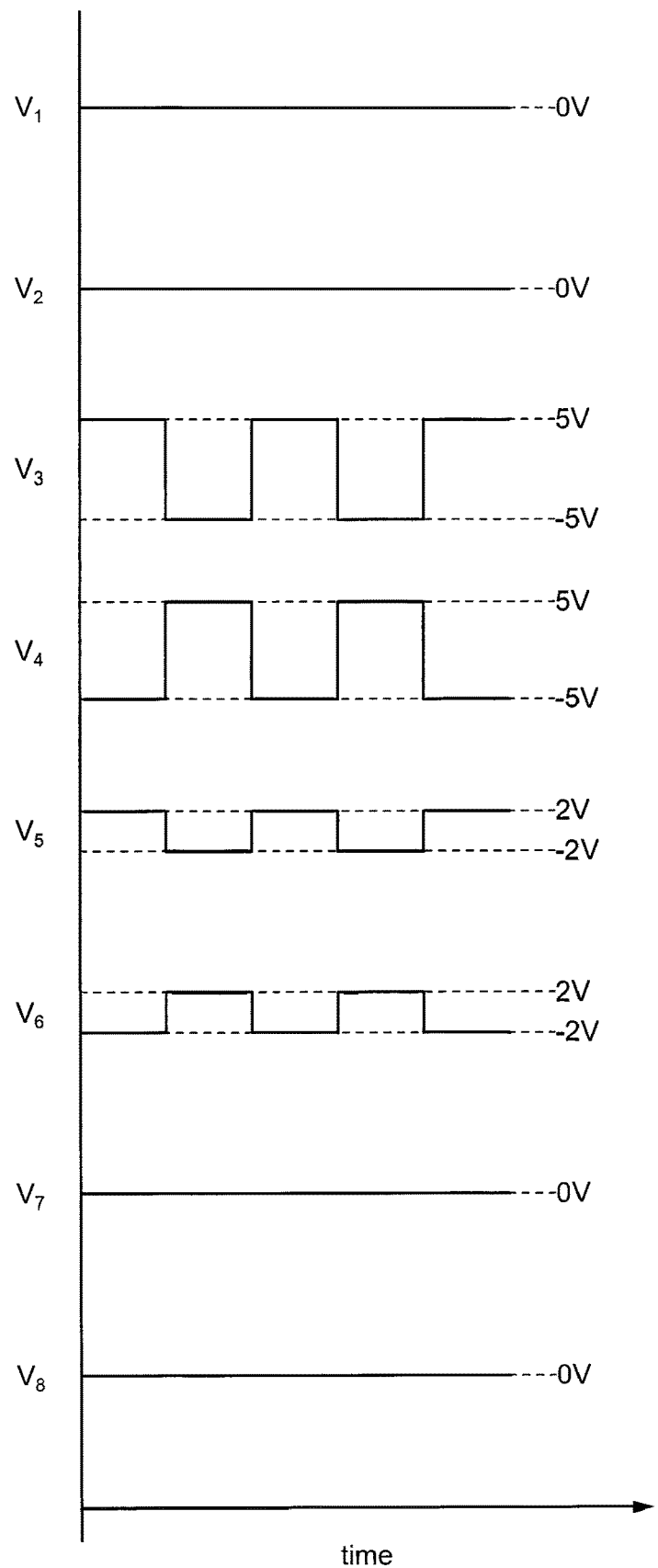
FIG. 9B is a timing chart showing potentials supplied to transparent electrodes of an optical element according to an embodiment of the present invention.

FIG. 9B is a timing chart showing potentials supplied to the transparent electrodes 130 of the optical element 10 according to an embodiment of the present invention.

The first potential V1 and the second potential V2 are the intermediate fixed potentials. That is, the first potential V1 and the second potential V2 are 0V.

The third potential V3 and the fourth potential V4 are variable potentials in which the low potential and the high potential are inverted. That is, the third potential V3 and the fourth potential V4 are potentials in which −5 V and +5 V are repeated. However, the phases of the third potential V3 and the fourth potential V4 are reversed. Therefore, the absolute value of the potential difference between the third potential V3 and the fourth potential V4 is 10 V.

The fifth potential V5 and the sixth potential V6 are variable potentials obtained by inverting the intermediate potential. That is, the fifth potential V5 and the sixth potential V6 are potentials in which −2 V and +2 V are repeated. However, the phases of the fifth potential V5 and the sixth potential V6 are reversed. Therefore, the absolute value of the potential difference between the fifth potential V5 and the sixth potential V6 is 4 V.

The seventh potential V7 and the eighth potential V8 are the intermediate fixed potentials. That is, the seventh potential V7 and the eighth potential V8 are 0V.

When the above-mentioned potentials are supplied to the transparent electrodes 130, the alignment state of the liquid crystal molecules in the liquid crystal layer 160 changes according to the potential difference. The light having polarization in the y-axis direction that enters the optical element 10 is diffused in the x-axis direction due to the potential difference (4 V) between the fifth transparent electrode 130-5 and the sixth transparent electrode 130-6 and the potential difference (4 V) between the eleventh transparent electrode 130-11 and the twelfth transparent electrode 130-12. Further, the light having polarization in the x-axis direction that enters the optical element 10 is diffused in the y-axis direction due to the potential difference (10 V) between the third transparent electrode 130-3 and the fourth transparent electrode 130-4 and the potential difference (10 V) between the thirteenth transparent electrode 130-13 and the fourteenth transparent electrode 130-14. Thus, of the light incident on the optical element 10, the light having polarization in the x-axis direction is diffused in the y-axis direction, and a portion of the light having polarization in the y-axis direction is diffused in the x-axis direction.

Figure 9C:
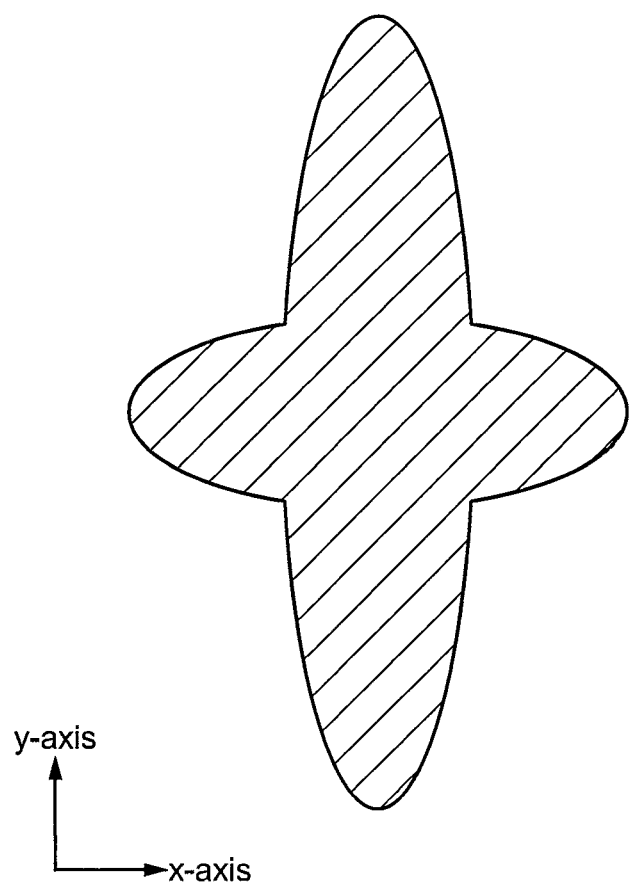
FIG. 9C is a schematic diagram showing a shape of a light distribution when potentials shown in a timing chart shown in FIG. 9A or FIG. 9B are supplied to transparent electrodes of an optical element according to an embodiment of the present invention.

FIG. 9C is a schematic diagram showing the shape of a light distribution when the potentials shown in the timing chart shown in FIG. 9A or FIG. 9B are supplied to the transparent electrodes 130 of the optical element 10 according to an embodiment of the present invention. The light distribution of the light transmitted through the optical element 10 has a cross shape in which the length in the y-axis direction is longer than the length in the x-axis direction, as shown in FIG. 9C.

Example 2. Cross Shape 2 with Shorter Length in Y-Axis Direction than in X-Axis Direction The light distribution of the cross shape with a shorter length in the y-axis direction than in the x-axis direction is described with reference to FIGS. 10A to 10C.

Figure 10A:
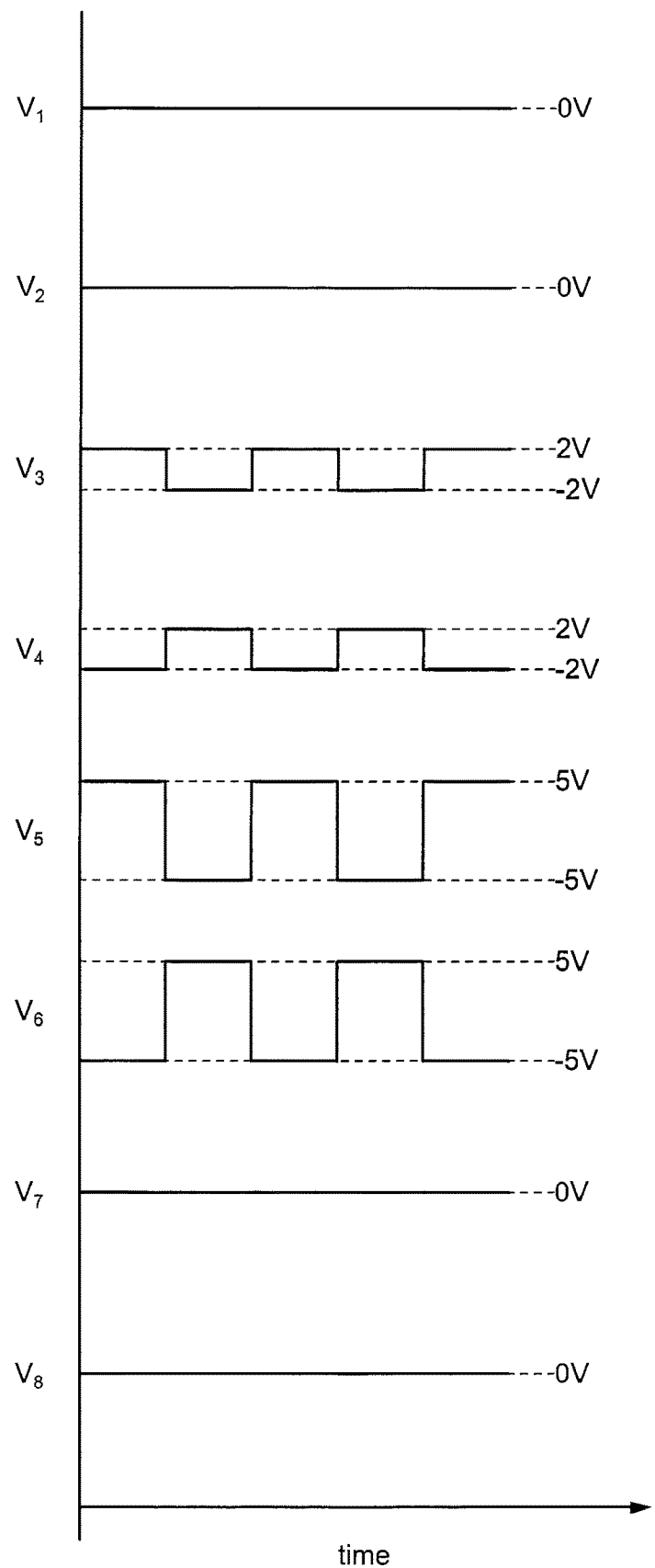
FIG. 10A is a timing chart showing potentials supplied to transparent electrodes of an optical element according to an embodiment of the present invention.

FIG. 10A is a timing chart showing potentials supplied to the transparent electrodes 130 of the optical element 10 according to an embodiment of the present invention.

The first potential V1 and the second potential V2 are the intermediate fixed potentials. That is, the first potential V1 and the second potential V2 are 0V.

The third potential V3 and the fourth potential V4 are variable potentials obtained by inverting the intermediate potential. That is, the third potential V3 and the fourth potential V4 are potentials in which −2 V and +2 V are repeated. However, the phases of the third potential V3 and the fourth potential V4 are reversed. Therefore, the absolute value of the potential difference between the third potential V3 and the fourth potential V4 is 4 V.

The fifth potential V5 and the sixth potential V6 are variable potentials in which the low potential and the high potential are inverted. That is, the fifth potential V5 and the sixth potential V6 are potentials in which −5 V and +5 V are repeated. However, the phases of the fifth potential V5 and the sixth potential V6 are reversed. Therefore, the absolute value of the potential difference between the fifth potential V5 and the sixth potential V6 is 10 V.

The seventh potential V7 and the eighth potential V8 are the intermediate fixed potentials. That is, the seventh potential V7 and the eighth potential V8 are 0V.

When the above-mentioned potentials are supplied to the transparent electrodes 130, the alignment state of the liquid crystal molecules in the liquid crystal layer 160 changes according to the potential difference. The light having polarization in the x-axis direction (for example, the P-polarization component) that enters the optical element 10 is diffused in the y-axis direction due to the potential difference (4 V) between the third transparent electrode 130-3 and the fourth transparent electrode 130-4 and the potential difference (4 V) between the thirteenth transparent electrode 130-13 and the fourteenth transparent electrode 130-14. Further, the light having polarization in the y-axis direction (for example, the S-polarization component) that enters the optical element 10 is diffused in the x-axis direction due to the potential difference (10 V) between the fifth transparent electrode 130-5 and the sixth transparent electrode 130-6 and the potential difference (10 V) between the eleventh transparent electrode 130-11 and the twelfth transparent electrode 130-12. Thus, of the light incident on the optical element 10, a portion of the light having polarization in the x-axis direction is diffused in the y-axis direction, and the light having polarization in the y-axis direction is diffused in the x-axis direction.

In the timing chart shown in FIG. 10A, although the light having polarization in the x-axis direction is diffused in the y-axis direction, it is also possible to diffuse light having polarization in the y-axis direction in the y-axis direction. This is described below.

Figure 10B:
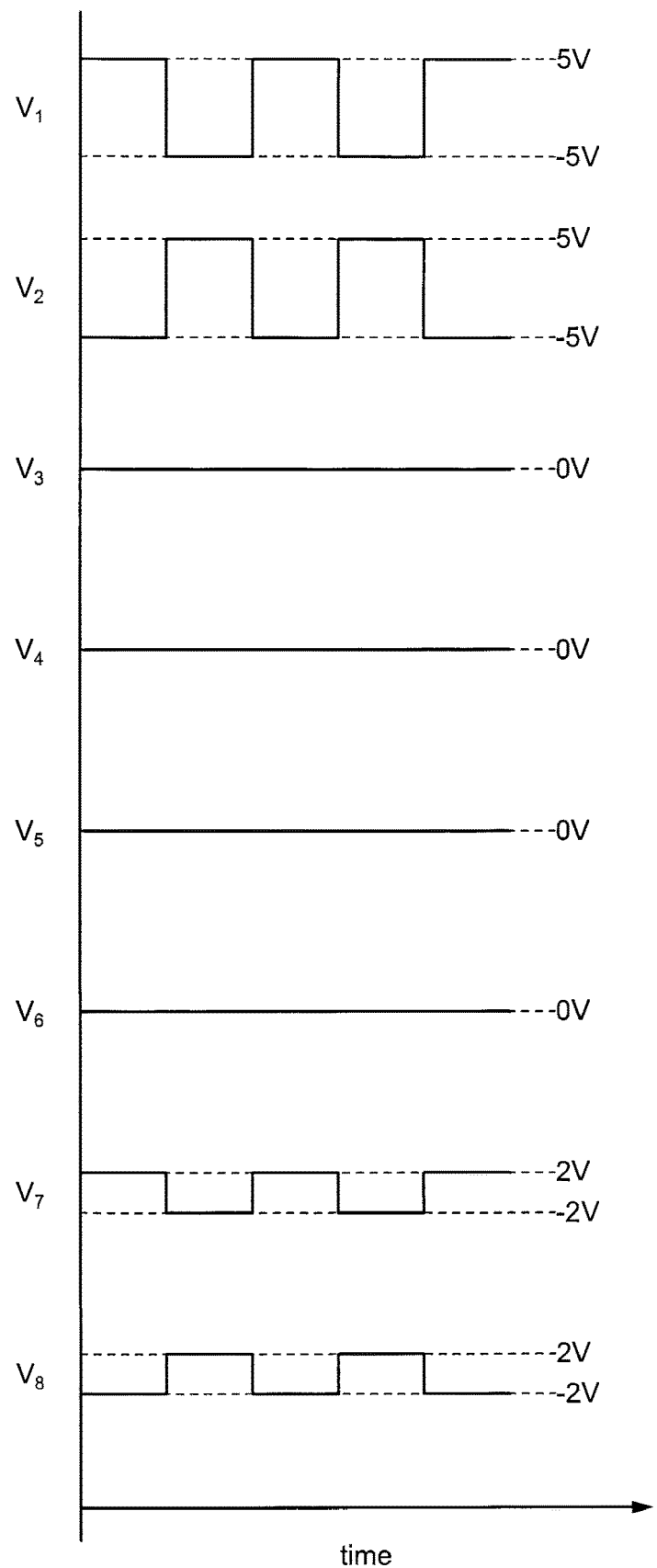
FIG. 10B is a timing chart showing potentials supplied to transparent electrodes of an optical element according to an embodiment of the present invention.

FIG. 10B is a timing chart showing potentials supplied to the transparent electrodes 130 of the optical element 10 according to an embodiment of the present invention.

The first potential V1 and the second potential V2 are variable potentials in which the low potential and the high potential are inverted. That is, the first potential V1 and the second potential V2 are potentials in which −5 V and +5 V are repeated. However, the phases of the first potential V1 and the second potential V2 are reversed. Therefore, the absolute value of the potential difference between the first potential V1 and the second potential V2 is 10 V.

The third potential V3 and the fourth potential V4 are the intermediate fixed potentials. That is, the third potential V3 and the fourth potential V4 are 0V.

The fifth potential V5 and the sixth potential V6 are the intermediate fixed potentials. That is, the fifth potential V5 and the sixth potential V6 are 0V.

The seventh potential V7 and the eighth potential V8 are variable potentials obtained by inverting the intermediate potential. That is, the seventh potential V7 and the eighth potential V8 are potentials in which −2 V and +2 V are repeated. However, the phases of the seventh potential V7 and the eighth potential V8 are reversed. Therefore, the absolute value of the potential difference between the seventh potential V7 and the eighth potential V8 is 4 V.

When the above-mentioned potentials are supplied to the transparent electrodes 130, the alignment state of the liquid crystal molecules in the liquid crystal layer 160 changes according to the potential difference. The light having polarization in the y-axis direction that enters the optical element 10 is diffused in the y-axis direction due to the potential difference (4 V) between the seventh transparent electrode 130-7 and the eighth transparent electrode 130-8 and the potential difference (4 V) between the ninth transparent electrode 130-9 and the tenth transparent electrode 130-10. Further, the light having polarization in the x-axis direction that enters the optical element 10 is diffused in the x-axis direction due to the potential difference (10 V) between the first transparent electrode 130-1 and the second transparent electrode 130-2 and the potential difference (10 V) between the fifteenth transparent electrode 130-15 and the sixteenth transparent electrode 130-16. Thus, of the light incident on the optical element 10, a portion of the light having polarization in the y-axis direction is diffused in the y-axis direction, and the light having polarization in the x-axis direction is diffused in the x-axis direction.

Figure 10C:
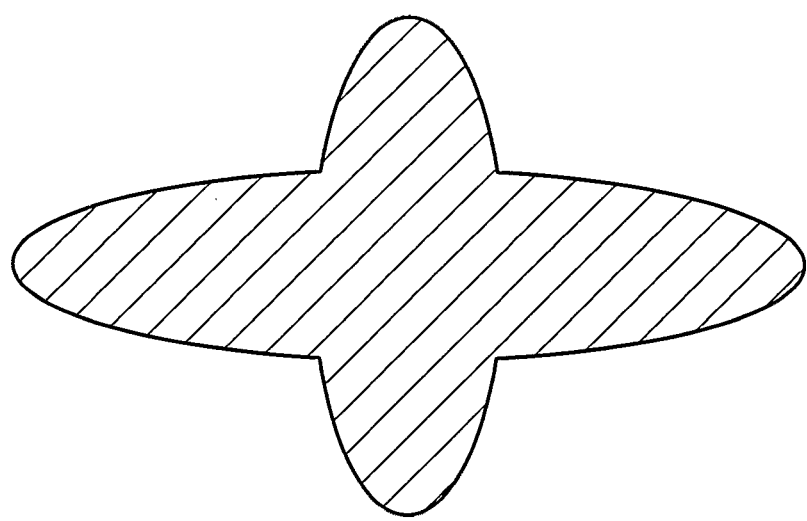
FIG. 10C is a schematic diagram showing a shape of a light distribution when potentials shown in a timing chart shown in FIG. 9A or FIG. 9B are supplied to transparent electrodes of an optical element according to an embodiment of the present invention.
Figure 10C:
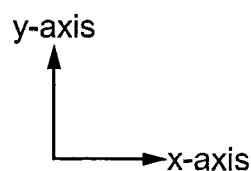

FIG. 10C is a schematic diagram showing the shape of a light distribution when the potentials shown in the timing chart shown in FIG. 10A or FIG. 10B are supplied to the transparent electrodes 130 of the optical element 10 according to an embodiment of the present invention. The light distribution of the light transmitted through the optical element 10 has a cross shape in which the length in the y-axis direction is shorter than the length in the x-axis direction, as shown in FIG. 10C.

As described above, according to the optical element 10 according to an embodiment of the present invention, the lengths in the first direction and the second direction can be controlled in a light distribution having a cross shape, which is an anisotropic shape.

Although a light distribution having several anisotropic shapes is described above, the length in the first direction and the length in the second direction can be controlled by the magnitude of the intermediate potential supplied to the transparent electrodes 130. For example, when the potential supplied to the transparent electrode 130 is increased, the light is more diffused and the length is increased. Further, the shape of the light distribution can also be controlled by, for example, the distance between the substrates 120 or the pitch between the transparent electrodes 130.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by the embodiment, but which are apparent from the description herein or which can be readily predicted by those skilled in the art, are naturally understood to be brought about by the present invention.

What is claimed is:

1. An optical element comprising:
   a first liquid crystal cell;
   a second liquid crystal cell over the first liquid crystal cell;
   a third liquid crystal cell over the second liquid crystal cell; and
   a fourth liquid crystal cell over the third liquid crystal cell,
   wherein the first liquid crystal cell comprises:
      a first substrate on which a first transparent electrode and a second transparent electrode are alternately arranged in a comb shape in a first direction; and
      a second substrate on which a third transparent electrode and a fourth transparent electrode are alternately arranged in a comb shape in a second direction intersecting the first direction,
   the second liquid crystal cell comprises:
      a third substrate adjacent to the second substrate and on which a fifth transparent electrode and a sixth transparent electrode are alternately arranged in a comb shape in the first direction; and
      a fourth substrate on which a seventh transparent electrode and an eighth transparent electrode are alternately arranged in a comb shape in the second direction,
   the third liquid crystal cell comprises:
      a fifth substrate adjacent to the fourth substrate and on which a ninth transparent electrode and a tenth transparent electrode are alternately arranged in a comb shape in the second direction; and
      a sixth substrate on which an eleventh transparent electrode and a twelfth transparent electrode are alternately arranged in a comb shape in the first direction,
   the fourth liquid crystal cell comprises:
      a seventh substrate adjacent to the sixth substrate and on which a thirteenth transparent electrode and a fourteenth transparent electrode are alternately arranged in a comb shape in the second direction; and
      an eighth substrate on which a fifteenth transparent electrode and a sixteenth transparent electrode are alternately arranged in a comb shape in the first direction,
   the first transparent electrode and the fifteenth transparent electrode are electrically connected to each other,
   the second transparent electrode and the sixteenth transparent electrode are electrically connected to each other,
   the third transparent electrode and the thirteenth transparent electrode are electrically connected to each other,
   the fourth transparent electrode and the fourteenth transparent electrode are electrically connected to each other,
   the fifth transparent electrode and the eleventh transparent electrode are electrically connected to each other,
   the six transparent electrode and the twelfth transparent electrode are electrically connected to each other,
   the seventh transparent electrode and the ninth transparent electrode are electrically connected to each other, and
   the eighth transparent electrode and the tenth transparent electrode are electrically connected to each other.

2. The optical element according to claim 1,
   wherein a first potential is supplied to the first transparent electrode and the fifteenth transparent electrode,
   a second potential is supplied to the second transparent electrode and the sixteenth transparent electrode,
   a third potential is supplied to the third transparent electrode and the thirteenth transparent electrode,
   a fourth potential is supplied to the fourth transparent electrode and the fourteenth transparent electrode,
   a fifth potential is supplied to the fifth transparent electrode and the eleventh transparent electrode,
   a sixth potential is supplied to the sixth transparent electrode and the twelfth transparent electrode,
   a seventh potential is supplied to the seventh transparent electrode and the ninth transparent electrode,
   an eighth potential is supplied to the eighth transparent electrode and the tenth transparent electrode, and
   the first to eighth potentials include three potentials with different absolute values.

3. The optical element according to claim 2, wherein an absolute value of a potential difference between the first potential and the second potential is less than an absolute value of a potential difference between the third potential and the fourth potential and an absolute value of a potential difference between the seventh potential and the eighth potential.

4. The optical element according to claim 3, wherein the fifth potential and the sixth potential are 0 V.

5. The optical element according to claim 3,
   wherein the third potential is equal to the seventh potential, and
   the fourth potential is equal to the eighth potential.

6. The optical element according to claim 5,
   wherein the first potential is equal to the fifth potential, and
   the second potential is equal to the sixth potential.

7. The optical element according to claim 2, wherein an absolute value of a potential difference between the fifth potential and the sixth potential is less than an absolute value of a potential difference between the third potential and the fourth potential and an absolute value of a potential difference between the seventh potential and the eighth potential.

8. The optical element according to claim 7, wherein the first potential and the second potential are 0 V.

9. The optical element according to claim 8,
   wherein the third potential is equal to the seventh potential, and
   the fourth potential is equal to the eighth potential.

10. The optical element according to claim 9,
    wherein the first potential is equal to the fifth potential, and
    the second potential is equal to the sixth potential.

11. The optical element according to claim 2, wherein an absolute value of a potential difference between the third potential and the fourth potential is less than an absolute value of a potential difference between the first potential and the second potential and an absolute value of a potential difference between the fifth potential and the sixth potential.

12. The optical element according to claim 11, wherein the seventh potential and the eighth potential are 0 V.

13. The optical element according to claim 11,
    wherein the first potential is equal to the fifth potential, and
    the second potential is equal to the sixth potential.

14. The optical element according to claim 13,
wherein the third potential is equal to the seventh potential, and
the fourth potential is equal to the eighth potential.

15. The optical element according to claim 2, wherein an absolute value of a potential difference between the seventh potential and the eighth potential is less than an absolute value of a potential difference between the first potential and the second potential and an absolute value of a potential difference between the fifth potential and the sixth potential.

16. The optical element according to claim 15, wherein the third potential and the fourth potential are 0 V.

17. The optical element according to claim 15,
wherein the first potential is equal to the fifth potential, and
the second potential is equal to the sixth potential.

18. The optical element according to claim 17,
wherein the third potential is equal to the seventh potential, and
the fourth potential is equal to the eighth potential.

* * * * *